(12) United States Patent
Hu et al.

(10) Patent No.: US 9,934,572 B2
(45) Date of Patent: Apr. 3, 2018

(54) DRAWBAR SCAN SOLUTION FOR LOCATING TRAILER HITCH POINT

(71) Applicant: Ford Global Technologies, LLC, Dearborn, MI (US)

(72) Inventors: Zheng Hu, Farmington Hills, MI (US); John P. Joyce, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 13 days.

(21) Appl. No.: 14/972,956

(22) Filed: Dec. 17, 2015

(65) Prior Publication Data
US 2017/0178328 A1   Jun. 22, 2017

(51) Int. Cl.
| G06K 9/00 | (2006.01) |
| G06T 7/00 | (2017.01) |
| H04N 7/18 | (2006.01) |

(52) U.S. Cl.
CPC .......... *G06T 7/0042* (2013.01); *G06T 7/0083* (2013.01); *G06T 7/0085* (2013.01); *H04N 7/183* (2013.01)

(58) Field of Classification Search
None
See application file for complete search history.

(56) References Cited

U.S. PATENT DOCUMENTS

| 3,542,390 A | 11/1970 | Fikes et al. |
| 3,605,088 A | 9/1971 | Savelli |
| 3,787,077 A | 1/1974 | Sanders |
| 3,833,928 A | 9/1974 | Gavit et al. |
| 3,860,257 A | 1/1975 | Mesley |
| 4,040,006 A | 8/1977 | Kimmel |
| 4,042,132 A | 8/1977 | Bohman et al. |
| 4,122,390 A | 10/1978 | Kollitz et al. |
| 4,212,483 A | 7/1980 | Howard |
| 4,366,966 A | 1/1983 | Ratsko et al. |
| 4,735,432 A | 4/1988 | Brown |

(Continued)

FOREIGN PATENT DOCUMENTS

| CN | 102582686 B | 9/2013 |
| DE | 3923676 A1 | 1/1991 |

(Continued)

OTHER PUBLICATIONS

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

(Continued)

*Primary Examiner* — Vikkram Bali
(74) *Attorney, Agent, or Firm* — Raymond Coppiellie; Price Heneveld LLP

(57) ABSTRACT

A system for locating an imaged hitch point between a vehicle and a trailer is provided herein. An imaging device is configured to capture images of the trailer. A controller is configured to select two images captured by the imaging device and derive an edge map for each of the two images. The controller determines the location of the imaged hitch point based on differences in pixel intensity associated with a number of predefined pixel positions common to the two images.

10 Claims, 16 Drawing Sheets

(56) References Cited

U.S. PATENT DOCUMENTS

| | | |
|---|---|---|
| 4,752,080 A | 6/1988 | Rogers |
| 4,848,449 A | 7/1989 | Martinet et al. |
| 4,852,901 A | 8/1989 | Beasley et al. |
| 4,943,080 A | 7/1990 | Reimer |
| 5,001,639 A | 3/1991 | Breen |
| 5,097,250 A | 3/1992 | Hernandez |
| 5,108,123 A | 4/1992 | Rubenzik |
| 5,108,158 A | 4/1992 | Breen |
| 5,132,851 A | 7/1992 | Bomar et al. |
| 5,152,544 A | 10/1992 | Dierker, Jr. et al. |
| 5,244,226 A | 9/1993 | Bergh |
| 5,246,242 A | 9/1993 | Penzotti |
| 5,247,442 A | 9/1993 | Kendall |
| 5,282,641 A | 2/1994 | McLaughlin |
| 5,289,892 A | 3/1994 | Notsu |
| 5,290,057 A | 3/1994 | Pellerito |
| 5,455,557 A | 10/1995 | Noll et al. |
| 5,521,633 A | 5/1996 | Nakajima et al. |
| 5,523,947 A | 6/1996 | Breen |
| 5,541,778 A | 7/1996 | DeFlorio |
| 5,558,350 A | 9/1996 | Kimbrough et al. |
| 5,579,228 A | 11/1996 | Kimbrough et al. |
| 5,631,656 A | 5/1997 | Hartman et al. |
| 5,650,764 A | 7/1997 | McCullough |
| 5,690,347 A | 11/1997 | Juergens et al. |
| 5,747,683 A | 5/1998 | Gerum et al. |
| 5,821,852 A | 10/1998 | Fairchild |
| 6,041,582 A | 3/2000 | Tiede et al. |
| 6,042,196 A | 3/2000 | Nakamura et al. |
| 6,124,709 A | 9/2000 | Allwine |
| 6,198,992 B1 | 3/2001 | Winslow |
| 6,218,828 B1 | 4/2001 | Bates et al. |
| 6,223,104 B1 | 4/2001 | Kamen et al. |
| 6,268,800 B1 | 7/2001 | Howard |
| 6,292,094 B1 | 9/2001 | Deng et al. |
| 6,351,698 B1 | 2/2002 | Kubota et al. |
| 6,472,865 B1 | 10/2002 | Tola et al. |
| 6,480,104 B1 | 11/2002 | Wall et al. |
| 6,483,429 B1 | 11/2002 | Yasui et al. |
| 6,494,476 B2 | 12/2002 | Masters et al. |
| 6,498,977 B2 | 12/2002 | Wetzel et al. |
| 6,539,288 B2 | 3/2003 | Ishida et al. |
| 6,568,093 B2 | 5/2003 | Kogiso et al. |
| 6,577,952 B2 | 6/2003 | Geier et al. |
| 6,668,225 B2 | 12/2003 | Oh et al. |
| 6,712,378 B1 | 3/2004 | Austin |
| 6,801,125 B1 | 10/2004 | McGregor et al. |
| 6,806,809 B2 | 10/2004 | Lee et al. |
| 6,820,888 B1 | 11/2004 | Griffin |
| 6,838,979 B2 | 1/2005 | Deng et al. |
| 6,854,557 B1 | 2/2005 | Deng et al. |
| 6,857,494 B2 | 2/2005 | Kobayashi et al. |
| 6,879,240 B2 | 4/2005 | Kruse |
| 6,956,468 B2 | 10/2005 | Lee et al. |
| 6,959,970 B2 | 11/2005 | Tseng |
| 6,999,856 B2 | 2/2006 | Lee et al. |
| 7,005,974 B2 | 2/2006 | McMahon et al. |
| 7,006,127 B2 | 2/2006 | Mizusawa et al. |
| 7,008,088 B2 | 3/2006 | Pisciotti |
| 7,028,804 B2 | 4/2006 | Eki et al. |
| 7,058,493 B2 | 6/2006 | Inagaki |
| 7,089,101 B2 | 8/2006 | Fischer et al. |
| 7,154,385 B2 | 12/2006 | Lee et al. |
| 7,159,890 B2 | 1/2007 | Craig et al. |
| 7,167,785 B2 | 1/2007 | Lohberg et al. |
| 7,170,285 B2 | 1/2007 | Spratte |
| 7,171,330 B2 | 1/2007 | Kruse et al. |
| 7,204,504 B2 | 4/2007 | Gehring et al. |
| 7,219,913 B2 | 5/2007 | Atley |
| 7,225,891 B2 | 6/2007 | Gehring et al. |
| 7,229,139 B2 | 6/2007 | Lu et al. |
| 7,239,958 B2 | 7/2007 | Grougan et al. |
| 7,269,489 B2 | 9/2007 | Deng et al. |
| 7,272,481 B2 | 9/2007 | Einig et al. |
| 7,295,907 B2 | 11/2007 | Lu et al. |
| 7,401,871 B2 | 7/2008 | Lu et al. |
| 7,405,557 B2 | 7/2008 | Spratte et al. |
| 7,413,266 B2 | 8/2008 | Lenz et al. |
| 7,447,585 B2 | 11/2008 | Tandy, Jr. et al. |
| 7,451,020 B2 | 11/2008 | Goetting et al. |
| 7,463,137 B2 | 12/2008 | Wishart et al. |
| 7,532,109 B2 | 5/2009 | Takahama et al. |
| 7,540,523 B2 | 6/2009 | Russell et al. |
| 7,548,155 B2 | 6/2009 | Schutt et al. |
| 7,568,716 B2 | 8/2009 | Dietz |
| 7,623,952 B2 | 11/2009 | Unruh et al. |
| 7,648,153 B2 | 1/2010 | Metternich et al. |
| 7,690,737 B2 | 4/2010 | Lu |
| 7,715,953 B2 | 5/2010 | Shepard |
| 7,731,302 B2 | 6/2010 | Tandy, Jr. et al. |
| 7,793,965 B2 | 9/2010 | Padula |
| 7,798,263 B2 | 9/2010 | Tandy, Jr. et al. |
| 7,878,545 B2 | 2/2011 | Rhymer et al. |
| 7,904,222 B2 | 3/2011 | Lee et al. |
| 7,905,507 B2 | 3/2011 | Perri |
| 7,950,751 B2 | 5/2011 | Offerle et al. |
| 7,953,536 B2 | 5/2011 | Katrak |
| 7,974,444 B2 | 7/2011 | Hongo |
| 8,010,252 B2 | 8/2011 | Getman et al. |
| 8,010,253 B2 | 8/2011 | Lundquist |
| 8,036,792 B2 | 10/2011 | Dechamp |
| 8,038,166 B1 | 10/2011 | Piesinger |
| 8,044,779 B2 | 10/2011 | Hahn et al. |
| 8,073,594 B2 | 12/2011 | Lee et al. |
| 8,157,284 B1 | 4/2012 | McGhie et al. |
| 8,165,770 B2 | 4/2012 | Getman et al. |
| 8,170,726 B2 | 5/2012 | Chen et al. |
| 8,174,576 B2 | 5/2012 | Akatsuka et al. |
| 8,180,543 B2 | 5/2012 | Futamura et al. |
| 8,190,364 B2 | 5/2012 | Rekow |
| 8,191,915 B2 | 6/2012 | Freese, V et al. |
| 8,223,204 B2 | 7/2012 | Hahn |
| 8,244,442 B2 | 8/2012 | Craig et al. |
| 8,260,518 B2 | 9/2012 | Englert |
| 8,267,485 B2 | 9/2012 | Barlsen et al. |
| 8,280,607 B2 | 10/2012 | Gatti et al. |
| 8,308,182 B2 | 11/2012 | Ortmann et al. |
| 8,326,504 B2 | 12/2012 | Wu et al. |
| 8,342,560 B2 | 1/2013 | Albers et al. |
| 8,380,390 B2 | 2/2013 | Sy et al. |
| 8,380,416 B2 | 2/2013 | Offerle et al. |
| 8,393,632 B2 | 3/2013 | Vortmeyer et al. |
| 8,401,744 B2 | 3/2013 | Chiocco |
| 8,427,288 B2 | 4/2013 | Schofield et al. |
| 8,469,125 B2 | 6/2013 | Yu et al. |
| 8,504,243 B2 | 8/2013 | Kageyama |
| 8,548,680 B2 | 10/2013 | Ryerson et al. |
| 8,548,683 B2 | 10/2013 | Cebon et al. |
| 8,675,953 B1 | 3/2014 | Elwell et al. |
| 8,755,984 B2 | 6/2014 | Rupp et al. |
| 8,807,261 B2 | 8/2014 | Subrt et al. |
| 8,825,328 B2 | 9/2014 | Rupp et al. |
| 8,833,789 B2 | 9/2014 | Anderson |
| 8,886,400 B2 | 11/2014 | Kossira et al. |
| 8,888,120 B2 | 11/2014 | Trevino |
| 8,909,426 B2 | 12/2014 | Rhode et al. |
| 8,930,140 B2 | 1/2015 | Trombley et al. |
| 8,939,462 B2 | 1/2015 | Adamczyk et al. |
| 8,955,865 B2 | 2/2015 | Fortin et al. |
| 8,972,109 B2 | 3/2015 | Lavoie et al. |
| 9,008,913 B1 | 4/2015 | Sears et al. |
| 9,026,311 B1 | 5/2015 | Pieronek et al. |
| 9,042,603 B2 | 5/2015 | Elwart et al. |
| 9,082,315 B2 | 7/2015 | Lin et al. |
| 9,108,598 B2 | 8/2015 | Headley |
| 9,114,832 B2 | 8/2015 | Wang et al. |
| 9,120,358 B2 | 9/2015 | Motts et al. |
| 9,120,359 B2 | 9/2015 | Chiu et al. |
| 9,156,496 B2 | 10/2015 | Greenwood et al. |
| 9,164,955 B2 | 10/2015 | Lavoie et al. |
| 9,180,890 B2 | 11/2015 | Lu et al. |
| 9,187,124 B2 | 11/2015 | Trombley et al. |
| 9,227,474 B2 | 1/2016 | Liu |
| 9,238,483 B2 | 1/2016 | Hafner et al. |

(56) References Cited

U.S. PATENT DOCUMENTS

| | | |
|---|---|---|
| 9,248,858 B2 | 2/2016 | Lavoie et al. |
| 9,315,212 B1 | 4/2016 | Kyrtsos et al. |
| 9,321,483 B2 | 4/2016 | Headley |
| 9,335,162 B2 | 5/2016 | Kyrtsos et al. |
| 9,340,228 B2 | 5/2016 | Xu et al. |
| 9,393,996 B2 | 7/2016 | Goswami et al. |
| 9,434,414 B2 | 9/2016 | Lavoie |
| 9,500,497 B2 | 11/2016 | Lavoie |
| 9,623,904 B2 | 4/2017 | Lavoie et al. |
| 9,676,377 B2 | 6/2017 | Hafner et al. |
| 2001/0037164 A1 | 11/2001 | Hecker |
| 2002/0128764 A1 | 9/2002 | Hecker et al. |
| 2004/0021291 A1 | 2/2004 | Haug et al. |
| 2004/0093139 A1 | 5/2004 | Wildey et al. |
| 2004/0130441 A1 | 7/2004 | Lee et al. |
| 2004/0222881 A1 | 11/2004 | Deng et al. |
| 2005/0000738 A1 | 1/2005 | Gehring et al. |
| 2005/0128059 A1 | 6/2005 | Vause |
| 2005/0206224 A1 | 9/2005 | Lu |
| 2005/0206225 A1 | 9/2005 | Offerle et al. |
| 2005/0206229 A1 | 9/2005 | Lu et al. |
| 2005/0206231 A1 | 9/2005 | Lu et al. |
| 2005/0236896 A1 | 10/2005 | Offerle et al. |
| 2006/0041358 A1 | 2/2006 | Hara |
| 2006/0071447 A1 | 4/2006 | Gehring et al. |
| 2006/0076828 A1 | 4/2006 | Lu et al. |
| 2006/0103511 A1 | 5/2006 | Lee et al. |
| 2006/0111820 A1 | 5/2006 | Goetting et al. |
| 2006/0142936 A1 | 6/2006 | Dix |
| 2006/0155455 A1 | 7/2006 | Lucas et al. |
| 2006/0244579 A1 | 11/2006 | Raab |
| 2007/0027581 A1 | 2/2007 | Bauer et al. |
| 2007/0090688 A1 | 4/2007 | Haemmerling et al. |
| 2007/0132560 A1 | 6/2007 | Nystrom et al. |
| 2007/0152424 A1 | 7/2007 | Deng et al. |
| 2008/0147277 A1 | 6/2008 | Lu et al. |
| 2008/0231701 A1 | 9/2008 | Greenwood et al. |
| 2008/0312792 A1 | 12/2008 | Dechamp |
| 2009/0005932 A1 | 1/2009 | Lee et al. |
| 2009/0079828 A1 | 3/2009 | Lee et al. |
| 2009/0085775 A1 | 4/2009 | Otsuka et al. |
| 2009/0093928 A1* | 4/2009 | Getman .............. B60T 8/1755 701/37 |
| 2009/0198425 A1 | 8/2009 | Englert |
| 2009/0228182 A1 | 9/2009 | Waldbauer et al. |
| 2009/0248346 A1 | 10/2009 | Fennel et al. |
| 2009/0300701 A1 | 12/2009 | Karaoguz et al. |
| 2010/0063702 A1 | 3/2010 | Sabelstrom et al. |
| 2010/0085427 A1* | 4/2010 | Cheng .................. H04N 7/183 348/118 |
| 2010/0171828 A1 | 7/2010 | Ishii |
| 2010/0332049 A1 | 12/2010 | Sy et al. |
| 2011/0001825 A1 | 1/2011 | Hahn |
| 2011/0018231 A1 | 1/2011 | Collenberg |
| 2011/0022282 A1 | 1/2011 | Wu et al. |
| 2011/0087398 A1 | 4/2011 | Lu et al. |
| 2011/0112721 A1 | 5/2011 | Wang et al. |
| 2011/0125457 A1 | 5/2011 | Lee et al. |
| 2011/0160956 A1 | 6/2011 | Chung et al. |
| 2011/0257860 A1 | 10/2011 | Getman et al. |
| 2012/0041658 A1 | 2/2012 | Turner |
| 2012/0086808 A1 | 4/2012 | Lynam et al. |
| 2012/0095649 A1 | 4/2012 | Klier et al. |
| 2012/0109471 A1 | 5/2012 | Wu |
| 2012/0112434 A1 | 5/2012 | Albers et al. |
| 2012/0185131 A1 | 7/2012 | Headley |
| 2012/0200706 A1 | 8/2012 | Greenwood et al. |
| 2012/0271512 A1 | 10/2012 | Rupp et al. |
| 2012/0271514 A1 | 10/2012 | Lavoie et al. |
| 2012/0271515 A1 | 10/2012 | Rhode et al. |
| 2012/0271522 A1 | 10/2012 | Rupp et al. |
| 2012/0283909 A1 | 11/2012 | Dix |
| 2012/0283910 A1 | 11/2012 | Lee et al. |
| 2012/0310594 A1 | 12/2012 | Watanabe |
| 2013/0006472 A1 | 1/2013 | McClain et al. |
| 2013/0024064 A1 | 1/2013 | Shepard |
| 2013/0027195 A1 | 1/2013 | Van Wiemeersch et al. |
| 2013/0082453 A1 | 4/2013 | Padula |
| 2013/0158863 A1 | 6/2013 | Skvarce et al. |
| 2013/0179038 A1 | 7/2013 | Goswami et al. |
| 2013/0207834 A1 | 8/2013 | Mizutani et al. |
| 2013/0226390 A1 | 8/2013 | Luo et al. |
| 2013/0250114 A1 | 9/2013 | Lu |
| 2013/0261843 A1 | 10/2013 | Kossira et al. |
| 2013/0268160 A1 | 10/2013 | Trombley et al. |
| 2014/0005918 A1 | 1/2014 | Qiang |
| 2014/0025260 A1 | 1/2014 | McClure |
| 2014/0058614 A1 | 2/2014 | Trombley et al. |
| 2014/0058622 A1 | 2/2014 | Trombley et al. |
| 2014/0058655 A1 | 2/2014 | Trombley et al. |
| 2014/0058668 A1 | 2/2014 | Trombley et al. |
| 2014/0067154 A1 | 3/2014 | Yu et al. |
| 2014/0067155 A1 | 3/2014 | Yu et al. |
| 2014/0085472 A1 | 3/2014 | Lu et al. |
| 2014/0088824 A1 | 3/2014 | Ishimoto |
| 2014/0160276 A1 | 6/2014 | Pliefke et al. |
| 2014/0172232 A1 | 6/2014 | Rupp et al. |
| 2014/0183841 A1 | 7/2014 | Jones |
| 2014/0188344 A1 | 7/2014 | Lavoie |
| 2014/0188346 A1 | 7/2014 | Lavoie |
| 2014/0200759 A1* | 7/2014 | Lu .......................... B60D 1/245 701/28 |
| 2014/0210456 A1 | 7/2014 | Crossman |
| 2014/0218506 A1 | 8/2014 | Trombley et al. |
| 2014/0218522 A1 | 8/2014 | Lavoie et al. |
| 2014/0222288 A1 | 8/2014 | Lavoie et al. |
| 2014/0236532 A1 | 8/2014 | Trombley et al. |
| 2014/0249691 A1 | 9/2014 | Hafner et al. |
| 2014/0267688 A1 | 9/2014 | Aich et al. |
| 2014/0267689 A1 | 9/2014 | Lavoie |
| 2014/0277941 A1 | 9/2014 | Chiu et al. |
| 2014/0277942 A1 | 9/2014 | Kyrtsos et al. |
| 2014/0297128 A1 | 10/2014 | Lavoie et al. |
| 2014/0303847 A1 | 10/2014 | Lavoie |
| 2014/0309888 A1 | 10/2014 | Smit et al. |
| 2014/0324295 A1 | 10/2014 | Lavoie |
| 2014/0343795 A1 | 11/2014 | Lavoie |
| 2014/0358429 A1 | 12/2014 | Shutko et al. |
| 2014/0379217 A1 | 12/2014 | Rupp et al. |
| 2015/0002670 A1 | 1/2015 | Bajpai |
| 2015/0035256 A1 | 2/2015 | Klank et al. |
| 2015/0057903 A1 | 2/2015 | Rhode et al. |
| 2015/0066296 A1 | 3/2015 | Trombley et al. |
| 2015/0066298 A1 | 3/2015 | Sharma et al. |
| 2015/0105975 A1 | 4/2015 | Dunn |
| 2015/0115571 A1 | 4/2015 | Zhang et al. |
| 2015/0120141 A1 | 4/2015 | Lavoie et al. |
| 2015/0120143 A1 | 4/2015 | Schlichting |
| 2015/0134183 A1 | 5/2015 | Lavoie et al. |
| 2015/0138340 A1 | 5/2015 | Lavoie |
| 2015/0149040 A1 | 5/2015 | Hueger et al. |
| 2015/0158527 A1 | 6/2015 | Hafner et al. |
| 2015/0165850 A1 | 6/2015 | Chiu et al. |
| 2015/0197278 A1 | 7/2015 | Boos et al. |
| 2015/0203156 A1 | 7/2015 | Hafner et al. |
| 2015/0210254 A1 | 7/2015 | Pieronek et al. |
| 2015/0210317 A1 | 7/2015 | Hafner et al. |
| 2015/0217693 A1 | 8/2015 | Pliefke et al. |
| 2015/0269444 A1 | 9/2015 | Lameyre et al. |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0059780 A1 | 3/2016 | Lavoie |
| 2016/0059888 A1 | 3/2016 | Bradley et al. |
| 2016/0059889 A1 | 3/2016 | Herzog et al. |
| 2016/0096549 A1 | 4/2016 | Herzog et al. |
| 2016/0129939 A1 | 5/2016 | Singh et al. |
| 2016/0152263 A1 | 6/2016 | Singh et al. |
| 2016/0153778 A1 | 6/2016 | Singh et al. |
| 2016/0229452 A1 | 8/2016 | Lavoie et al. |

(56) References Cited

U.S. PATENT DOCUMENTS

| | | |
|---|---|---|
| 2016/0280267 A1 | 9/2016 | Lavoie et al. |
| 2017/0073005 A1 | 3/2017 | Ghneim et al. |

FOREIGN PATENT DOCUMENTS

| | | |
|---|---|---|
| DE | 19526702 A1 | 2/1997 |
| DE | 10030738 C1 | 8/2001 |
| DE | 10031244 A1 | 1/2002 |
| DE | 10065230 A1 | 7/2002 |
| DE | 10122562 C1 | 7/2002 |
| DE | 10312548 B3 | 5/2004 |
| DE | 10333998 A1 | 2/2005 |
| DE | 102004050149 A1 | 4/2006 |
| DE | 102005042957 A1 | 3/2007 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102006048947 A1 | 4/2008 |
| DE | 102006056408 A1 | 6/2008 |
| DE | 102008020838 A1 | 11/2008 |
| DE | 102007029413 A1 | 1/2009 |
| DE | 102008045436 A1 | 3/2010 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102009027041 A1 | 12/2010 |
| DE | 102009038552 A1 | 2/2011 |
| DE | 102010006323 A1 | 8/2011 |
| DE | 102008004158 B4 | 10/2011 |
| DE | 102008004159 B4 | 10/2011 |
| DE | 102008004160 B4 | 10/2011 |
| DE | 102010021052 A1 | 11/2011 |
| DE | 102010029184 A1 | 11/2011 |
| DE | 102010045519 A1 | 3/2012 |
| DE | 102011104256 A1 | 7/2012 |
| DE | 102011101990 B3 | 10/2012 |
| DE | 102012005707 A1 | 10/2012 |
| DE | 202012010517 U | 12/2012 |
| DE | 102011108440 A1 | 1/2013 |
| DE | 102011120814 A1 | 6/2013 |
| DE | 102012006206 A1 | 10/2013 |
| DE | 102012206133 A1 | 10/2013 |
| DE | 102012019234 A1 | 4/2014 |
| DE | 102013000198 A1 | 7/2014 |
| EP | 0433858 A2 | 6/1991 |
| EP | 1361543 A2 | 11/2003 |
| EP | 1593552 B1 | 3/2007 |
| EP | 1810913 A1 | 7/2007 |
| EP | 2388180 A2 | 11/2011 |
| EP | 2452549 A1 | 5/2012 |
| EP | 2487454 A2 | 8/2012 |
| EP | 2551132 A1 | 1/2013 |
| EP | 2644477 A1 | 10/2013 |
| EP | 2803944 A2 | 11/2014 |
| FR | 2515379 A1 | 4/1983 |
| GB | 2265587 A | 10/1993 |
| GB | 2342630 A | 4/2000 |
| GB | 2398048 A | 8/2004 |
| GB | 2398049 A | 8/2004 |
| GB | 2398050 A | 8/2004 |
| JP | 61006458 | 1/1986 |
| JP | 6159491 A | 3/1986 |
| JP | 6385568 U | 6/1988 |
| JP | 01095980 A | 4/1989 |
| JP | 01095981 A | 4/1989 |
| JP | 09267762 A | 10/1997 |
| JP | 09328078 A | 12/1997 |
| JP | 10001063 A | 1/1998 |
| JP | 11124051 A | 5/1999 |
| JP | 11278319 A | 10/1999 |
| JP | 2002012172 A | 1/2002 |
| JP | 2002068032 A | 3/2002 |
| JP | 2003034261 A | 2/2003 |
| JP | 2003148938 A | 5/2003 |
| JP | 3716722 B2 | 11/2005 |
| JP | 2008027138 A1 | 2/2008 |
| JP | 2012105158 A | 5/2012 |
| JP | 2012166647 A | 9/2012 |
| JP | 2014002056 A | 1/2014 |
| WO | 8503263 A1 | 8/1985 |
| WO | 0044605 A1 | 8/2000 |
| WO | 2005005200 A2 | 1/2005 |
| WO | 2005116688 A2 | 12/2005 |
| WO | 2006042665 A1 | 4/2006 |
| WO | 2012059207 A1 | 5/2012 |
| WO | 2012103193 A1 | 8/2012 |
| WO | 2014019730 A1 | 2/2014 |
| WO | 2014123575 A1 | 8/2014 |
| WO | 2015074027 A1 | 5/2015 |
| WO | 2015187467 A1 | 12/2015 |

OTHER PUBLICATIONS

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.
"Ford Super Duty: Truck Technologies", Brochure, Sep. 2011, 2 pages.
Kristopher Bunker, "2012 Guide to Towing", Trailer Life, 2012, 38 pages.
A. Gonzalez-Cantos, "Backing-Up Maneuvers of Autonomous Tractor-Trailer Vehicles using the Qualitative Theory of Nonlinear Dynamical Systems," International Journal of Robotics Research, Jan. 2009, vol. 28, 1 page.
L. Chu, Y. Fang, M. Shang, J. Guo, F. Zhou, "Estimation of Articulation Angle for Tractor Semi-Trailer Based on State Observer", ACM Digital Library, ICMTMA '10 Proceedings of the 2010 International Conference on Measuring Technology and Automation, vol. 2, Mar. 2010, 1 page.
M. Wagner, D. Zoebel, and A. Meroth, "Adaptive Software and Systems Architecture for Driver Assistance Systems" International Journal of Machine Learning and Computing, Oct. 2011, vol. 1, No. 4, 7 pages.
C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, 8 pages.
Zhe Leng; Minor, M., "A Simple Tractor-Trailer Backing Control Law for Path Following", IEEE, Intelligent Robots and Systems (IROS) IEEE/RSJ International Conference, Oct. 2010, 2 pages.
Kinjo, H.; Maeshiro, M.; Uezato, E.; Yamamoto, T., "Adaptive Genetic Algorithm Observer and its Application to Trailer Truck Control System", IEEE, SICE-ICASE International Joint Conference, Oct. 2006, 2 pgs.
J.Roh; H. Lee; W.Chung, "Control of a Car with a Trailer Using the Driver Assistance System", IEEE, International conference on Robotics and Biomimetics; Phuket, Thailand, Dec. 2011, 6 pages.
A. Gonzalez-Cantos; J.I. Maza; A. Ollero, "Design of a Stable Backing Up Fuzzy Control of Autonomous Articulated Vehicles for Factory Automation", Dept. of Systems Engineering and Automatic Control, University of Seville, Spain, 2001, 5 pages.
Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pages.
Zare, A. Sharafi; M. Kamyad, A.V., "A New Approach in Intelligent Trailer Parking", IEEE, 2010 2nd International Mechanical and Electrical Technology (ICMET), Sep. 2010, 1 page.
Tanaka, K.; Sano, M., "A Robust Stabilization Problem of Fuzzy Control Systems and its Application to Backing up control of a Truck-trailer", IEEE Transactions on Fuzzy Systems, May 1994, vol. 2, No. 2, 1 page.
Sharafi, M. Zare; A. Kamyad; A.V. Nikpoor, S., "Intelligent Parking Method for Truck in Presence of Fixed and Moving Obstacles and Trailer in Presence of Fixed Obstacles: Advanced Fuzzy Logic

(56) References Cited

OTHER PUBLICATIONS

Technologies in Industrial Applications", IEEE, 2010 International Electronics and Information Engineering (ICEIE), Aug. 2010, vol. 2, 1 page.
Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 2007, 1 page.
Sharafi, M. Zare; A. Kamyad; A.V. Nikpoor, S., "Intelligent Parking Method for Trailers in Presence of Fixed and Moving Obstacles", IEEE, 2010 3rd International Conference on Advanced Computer Theory and Engineering (ICACTE), Aug. 2010, vol. 6, 1 page.
Chieh Chen; Tomizuka, M., "Steering and Independent Braking Control for Tractor-Semitrailer Vehicles in Automated Highway Systems", IEEE, Proceedings of the 34th IEEE Conference on Decision and Control, Dec. 1995, vol. 2, 1 page.
P. Bolzern, Rai Desantis, A. Locatelli, "An Input-Output Linearization Approach to the Control of an n-Body Articulated Vehicle", J. Dyn. Sys., Meas., Control, Sep. 2001, vol. 123, No. 3, 3 pages.
Jesus Morales, Anthony Mandow, Jorge L. Martinez, and Alfonso Garcia-Cerezo, "Driver Assistance System for Backward Maneuvers in Passive Multi-Trailer Vehicles", IEEE/RSJ International Conference on Intelligent Robots and Systems (IROS), Oct. 2012, 7 pages.
Cedric Pradalier and Kane Usher, "Experiments in Autonomous Reversing of a Tractor-Trailer System", 6th International Conference on Field and Service Robotics, inria-00195700, Version 1, Dec. 2007, 10 pages.
Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, 14 pages.
Cedric Pradalier and Kane Usher, "Robust Trajectory Tracking for a Reversing Tractor-Trailer System", (Draft), Field and Service Robotics Conference, CSIRO ICT Centre, Jul. 2007, 16 pages.
Stahn, R.; Heiserich, G.; Stopp, A., "Laser Scanner-Based Navigation for Commercial Vehicles", IEEE, 2007 IEEE Intelligent Vehicles Symposium, Jun. 2007, 1 page.
Lee Yong H.; Weiwen Deng; Chin Yuen-Kwok Steve; McKay Neil, "Feasibility Study for a Vehicle-Trailer Backing Up Control", Refdoc.fr, SAE Transactions, vol. 113, No. 6, 2004, 1 page.
A.M.C. Odhams; R.L. Roebuck; B.A. Jujnovich; D. Cebon, "Active Steering of a Tractor-Semi-Trailer" Proceedings of the Institution of Mechanical Engineers, Part D: Journal of Automobile Engineering, SAGE Journals, vol. 225, No. 7, Jul. 2011, 1 page.
Haviland, G S, "Automatic Brake Control for Trucks—What Good Is It?", TRID, Society of Automotive Engineers, Sep. 1968, 1 page.
"VSE Electronic Trailer Steering", ETS for Trailers, version 2009, VSE Trailer Systems B.V., 2009, 28 pages.
"Telematics Past, Present, and Future," Automotive Service Association, www.ASAshop.org, May 2008, 20 pages.
P.D.C.R Jayarathna; J.V Wijayakulasooriya; S.R Kodituwakku, "Fuzzy Logic and Neural Network Control Systems for Backing up a Truck and a Trailer", International Journal of Latest Trends in Computing, vol. 2, No. 3, Sep. 2011, 8 pages.
Olof Enqvist, "AFS-Assisted Trailer Reversing," Institutionen för systemteknik Deartment of Electrical Engineering, Jan. 27, 2006, 57 pages.

* cited by examiner

DRAWBAR SCAN SOLUTION FOR LOCATING TRAILER HITCH POINT

FIELD OF THE INVENTION

The present invention generally relates to trailer backup assist systems, and more particularly, to trailer backup assist systems employing hitch angle detection through image processing.

BACKGROUND OF THE INVENTION

Reversing a vehicle while towing a trailer can be challenging for many drivers, particularly for drivers that drive with a trailer on an infrequent basis or with various types of trailers. Some systems used to assist a driver in backing a trailer rely on hitch angle measurements to determine the position of the trailer relative to the vehicle. Thus, the accuracy and reliability of the hitch angle measurements can be critical to the operation of the trailer backup assist system.

SUMMARY OF THE INVENTION

According to one aspect of the present invention, a system for locating an imaged hitch point between a vehicle and a trailer is provided. An imaging device is configured to capture images of the trailer. A controller is configured to select two images captured by the imaging device and derive an edge map for each of the two images. The controller determines the location of the imaged hitch point based on differences in pixel intensity associated with a number of predefined pixel positions common to the two images.

According to another aspect of the present invention, a method of locating an imaged hitch point between a vehicle and a trailer is provided. The method includes the steps of capturing images of the trailer using an imaging device and providing a controller configured to select two images captured by the imaging device. The controller derives an edge map for each of the two images and determines the location of the imaged hitch point based on differences in pixel intensity associated with a number of predefined pixel positions common to the two images.

According to yet another aspect of the present invention, a method of locating an imaged hitch point between a vehicle and a trailer is provided. The method includes the steps of capturing images of the trailer using an imaging device and providing a controller configured to a) select two images captured by the imaging device and b) derives an edge map for each of the two images. The controller c) defines a detection window centered at a common pixel position in each of the two images and d) calculates an average pixel intensity of the pixels bounded by each detection window. The controller e) calculates an averaged pixel difference defined as the absolute value of the difference between the average pixel intensities calculated at d). The controller f) shifts each detection window in a common direction such that the detection window in each of the two images is centered at a new common pixel position. The controller g) iterates d)-f) until the calculated averaged pixel difference meets or exceeds a threshold value and h) selects, as the imaged hitch point, the common pixel position associated with the calculated averaged pixel difference that meets or exceeds the threshold value.

These and other features, advantages, and objects of the present invention will be further understood and appreciated by those skilled in the art by reference to the following specification, claims, and appended drawings.

DETAILED DESCRIPTION OF THE PREFERRED EMBODIMENTS

For purposes of description herein, it is to be understood that the disclosed trailer backup assist system and the related methods may assume various alternative embodiments and orientations, except where expressly specified to the contrary. It is also to be understood that the specific devices and processes illustrated in the attached drawings, and described in the following specification, are simply exemplary embodiments of the inventive concepts defined in the appended claims. While various aspects of the trailer backup assist system and the related methods are described with reference to a particular illustrative embodiment, the disclosed invention is not limited to such embodiments, and additional modifications, applications, and embodiments may be implemented without departing from the disclosed invention. Hence, specific dimensions and other physical characteristics relating to the embodiments disclosed herein are not to be considered as limiting, unless the claims expressly state otherwise.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Figure 1:
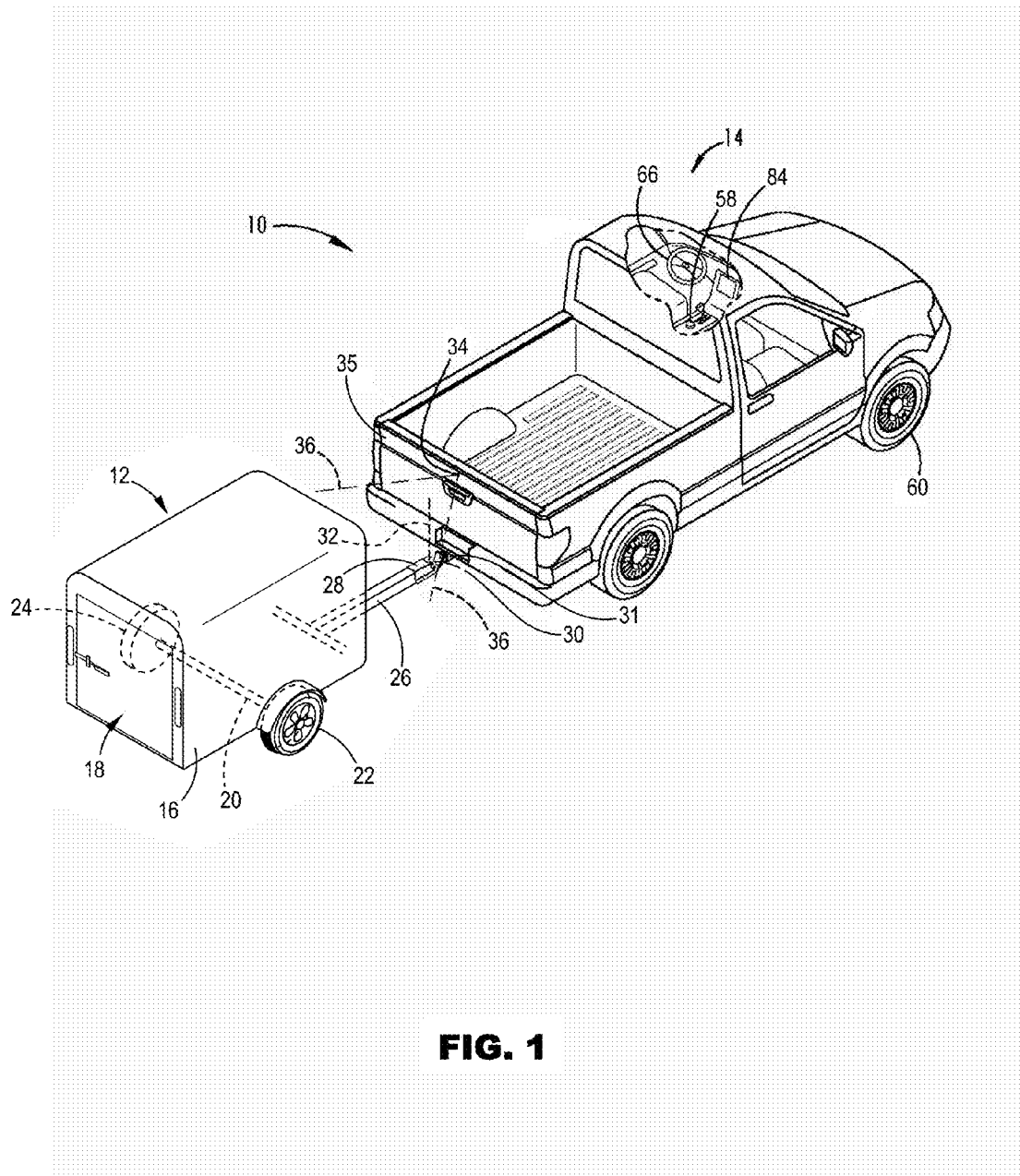
FIG. 1 is a top perspective view of a vehicle attached to a trailer with one embodiment of a hitch angle sensor for operating a trailer backup assist system.
Figure 2:
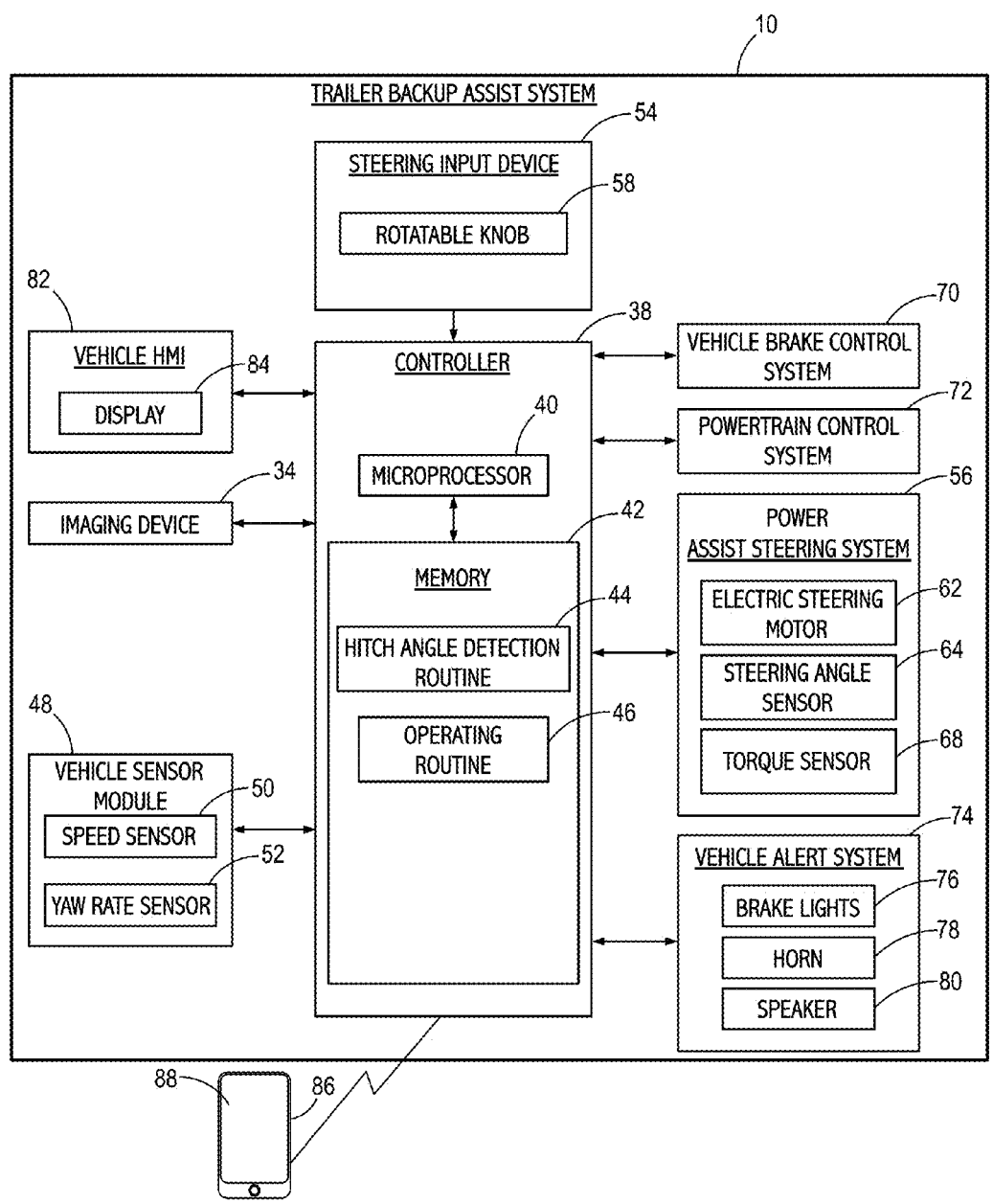
FIG. 2 is a block diagram illustrating one embodiment of the trailer backup assist system having a steering input device, a curvature controller, and a trailer braking system.
Figure 17:
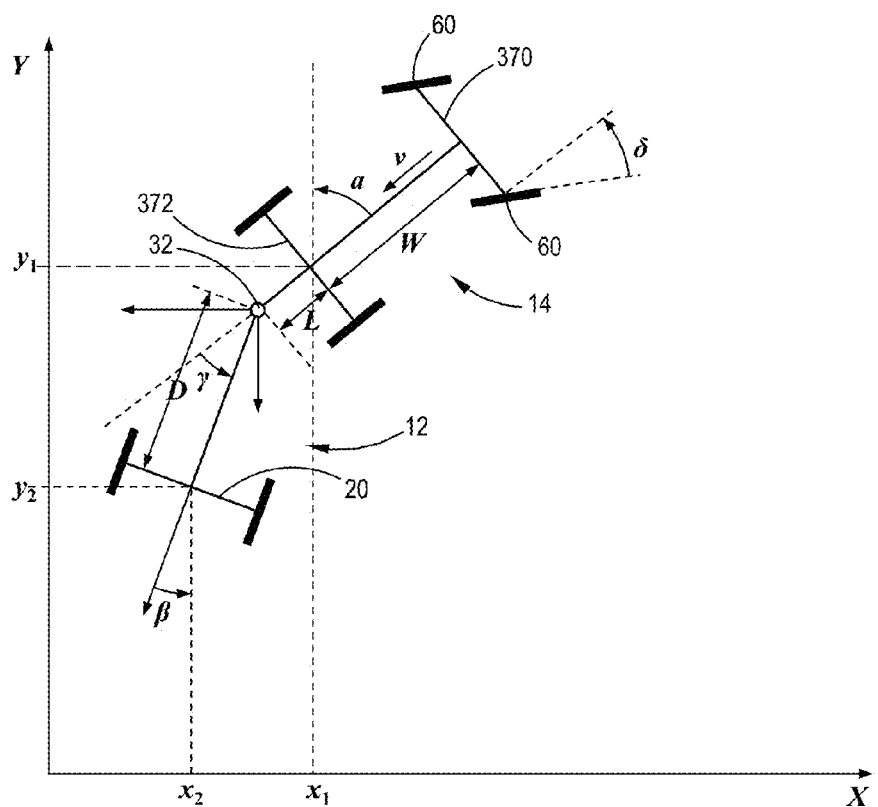
FIG. 17 is a kinematic model of the vehicle and trailer shown in FIG. 1.

Referring to FIGS. 1 and 2, reference numeral 10 generally designates a trailer backup assist system for controlling a backing path of a trailer 12 attached to a vehicle 14 by allowing a driver of the vehicle 14 to specify a desired curvature of the backing path of the trailer 12. The vehicle 14 is embodied as a pickup truck that is is pivotally attached to one embodiment of the trailer 12 that has a box frame 16 with an enclosed cargo area 18, a single axle 20 operably coupled to wheels 22 and 24, and a tongue 26 longitudinally extending forward from the enclosed cargo area 18. The illustrated trailer 12 also has a trailer hitch connector in the form of a coupler assembly 28 that is connected to a vehicle hitch connector in the form of a hitch ball 30 and drawbar 31. The coupler assembly 28 latches onto the hitch ball 30 to provide a pivoting hitch point 32 that allows for articulation of a hitch angle between the vehicle 14 and the trailer 12. As defined herein, the hitch angle corresponds to the angle formed between the center longitudinal axis of the vehicle 14 and of the trailer 12 (see hitch angle γ; FIG. 17). It should be appreciated that additional embodiments of the trailer 12 may alternatively couple with the vehicle 14 to provide a pivoting connection, such as by connecting with a fifth wheel connector. It is also contemplated that additional embodiments of the trailer 12 may include more than one axle and may have various shapes and sizes configured for different loads and items, such as a boat trailer or a flatbed trailer.

The trailer backup assist system 10 also includes an imaging device 34 located at the rear of the vehicle 14 and configured to image a rear-vehicle scene. The imaging device 34 may be centrally located at an upper region of a vehicle tailgate 35 such that the imaging device 34 is elevated relative to the tongue 26 of the trailer 12. The imaging device 34 has a field of view 36 located and oriented to capture one or more images that may include the tongue 26 of the trailer 12 and the hitch ball 30, among other things. Captured images are supplied to a controller 38 of the trailer backup assist system 10 and are processed by the controller 38 to determine the hitch angle between the vehicle 14 and the trailer 12, as will be described in greater detail herein. The controller 38 is configured with a microprocessor 40 and/or other analog and/or digital circuitry for processing one or more logic routines stored in a memory 42. The logic routines may include one or more hitch angle detection routines 44 and an operating routines 46. Information from the imaging device 34 or other components of the trailer backup assist system 10 can be supplied to the controller 38 via a communication network of the vehicle 14, which can include a controller area network (CAN), a local interconnect network (LIN), or other conventional protocols used in the automotive industry. It should be appreciated that the controller 38 may be a stand-alone dedicated controller or may be a shared controller integrated with the imaging device 34 or other component of the trailer backup assist system 10 in addition to any other conceivable onboard or off-board vehicle control systems.

With respect to the present embodiment, the controller 38 of trailer backup assist system 10 may be configured to communicate with a variety of vehicle equipment. The trailer backup assist system 10 may include a vehicle sensor module 48 that monitors certain dynamics of the vehicle 14. The vehicle sensor module 48 may generate a plurality of signals that are communicated to the controller 38 and may include a vehicle speed signal generated by a speed sensor 50 and a vehicle yaw rate signal generated by a yaw rate sensor 52. A steering input device 54 may be provided to enable a driver to control or otherwise modify the desired curvature of the backing path of the trailer 12. The steering input device 54 may be communicatively coupled to the controller 38 in a wired or wireless manner and provides the controller 38 with information defining the desired curvature of the backing path of the trailer 12. In response, the controller 38 processes the information and generates corresponding steering commands that are supplied to a power assist steering system 56 of the vehicle 14. In one embodiment, the steering input device 54 includes a rotatable knob 58 operable between a number of rotated positions that each provide an incremental change to the desired curvature of the backing path of the trailer 12.

According to one embodiment, the controller 38 of the trailer backup assist system 10 may control the power assist steering system 56 of the vehicle 14 to operate the steered wheels 60 of the vehicle 14 for moving the vehicle 14 in such a manner that the trailer 12 reacts in accordance with the desired curvature of the backing path of the trailer 12. The power assist steering system 56 may be an electric power-assisted steering (EPAS) system that includes an electric steering motor 62 for turning the steered wheels 60 to a steering angle based on a steering command generated by the controller 38, whereby the steering angle may be sensed by a steering angle sensor 64 of the power assist steering system 56 and provided to the controller 38. The steering command may be provided for autonomously steering the vehicle 14 during a backup maneuver and may alternatively be provided manually via a rotational position (e.g., a steering wheel angle) of a steering wheel 66 or the rotatable knob 58. However, in some embodiments, the steering wheel 66 of the vehicle 14 may be mechanically coupled with the steered wheels 60 of the vehicle 14, such that the steering wheel 66 moves in concert with steered wheels 60 via an internal torque, thereby preventing manual intervention with the steering wheel 66 during autonomous steering of the vehicle 14. In such instances, the power assist steering system 56 may include a torque sensor 68 that senses torque (e.g., gripping and/or turning) on the steering wheel 66 that is not expected from autonomous control of the steering wheel 68 and therefore indicative of manual intervention by the driver. In some embodiments, external torque applied to the steering wheel 66 may serve as a signal to the controller 38 that the driver has taken manual control and for the trailer backup assist system 10 to discontinue autonomous steering functionality.

The controller 38 of the trailer backup assist system 10 may also communicate with a vehicle brake control system 70 of the vehicle 14 to receive vehicle speed information such as individual wheel speeds of the vehicle 14. Additionally or alternatively, vehicle speed information may be provided to the controller 38 by a powertrain control system 72 and/or the speed sensor 50, among other conceivable means. It is conceivable that individual wheel speeds may be used to determine a vehicle yaw rate, which can be provided to the controller 38 in the alternative, or in addition to, the vehicle yaw rate measured by yaw rate sensor 52 of the vehicle sensor module 48. In some embodiments, the controller 38 may provide braking commands to the vehicle brake control system 70, thereby allowing the trailer backup assist system 10 to regulate the speed of the vehicle 14 during a backup maneuver of the trailer 12. It should be appreciated that the controller 38 may additionally or alternatively regulate the speed of the vehicle 14 via interaction with the powertrain control system 72.

Through interaction with the power assist steering system 56, the vehicle brake control system 70, and/or the powertrain control system 72 of the vehicle 14, the potential for unacceptable trailer backup conditions can be reduced. Examples of unacceptable trailer backup conditions include, but are not limited to, a vehicle over-speed condition, a high hitch angle rate, hitch angle dynamic instability, a trailer jackknife condition, sensor failure, and the like. In such circumstances, the driver may be unaware of the failure until the unacceptable trailer backup condition is imminent or already happening. Therefore, it is disclosed herein that the controller 38 of the trailer backup assist system 10 can generate an alert signal corresponding to a notification of an actual, impending, and/or anticipated unacceptable trailer backup condition, and prior to driver intervention, generate a counter measure to prevent such an unacceptable trailer backup condition.

According to one embodiment, the controller 38 may communicate with one or more devices, including a vehicle alert system 74, which may prompt visual, auditory, and tactile warnings. For instance, vehicle brake lights 76 and vehicle emergency flashers may provide a visual alert and a vehicle horn 78 and/or speaker 80 may provide an audible alert. Additionally, the controller 38 and/or vehicle alert system 74 may communicate with a human machine interface (HMI) 82 of the vehicle 14. The HMI 82 may include a touchscreen vehicle display 84 such as a center-stack mounted navigation or entertainment display capable of displaying images indicating the alert. Such an embodiment may be desirable to notify the driver of the vehicle 14 that an unacceptable trailer backup condition is afoot. Further, it is contemplated that the controller 38 may communicate via wireless communication with one or more electronic portable devices such as portable electronic device 86, which is embodied as a smartphone. The portable electronic device 86 may include a display 88 for displaying one or more images and other information to a user. In response, the portable electronic device 86 may provide feedback information, such as visual, audible, and tactile alerts.

Figure 3:
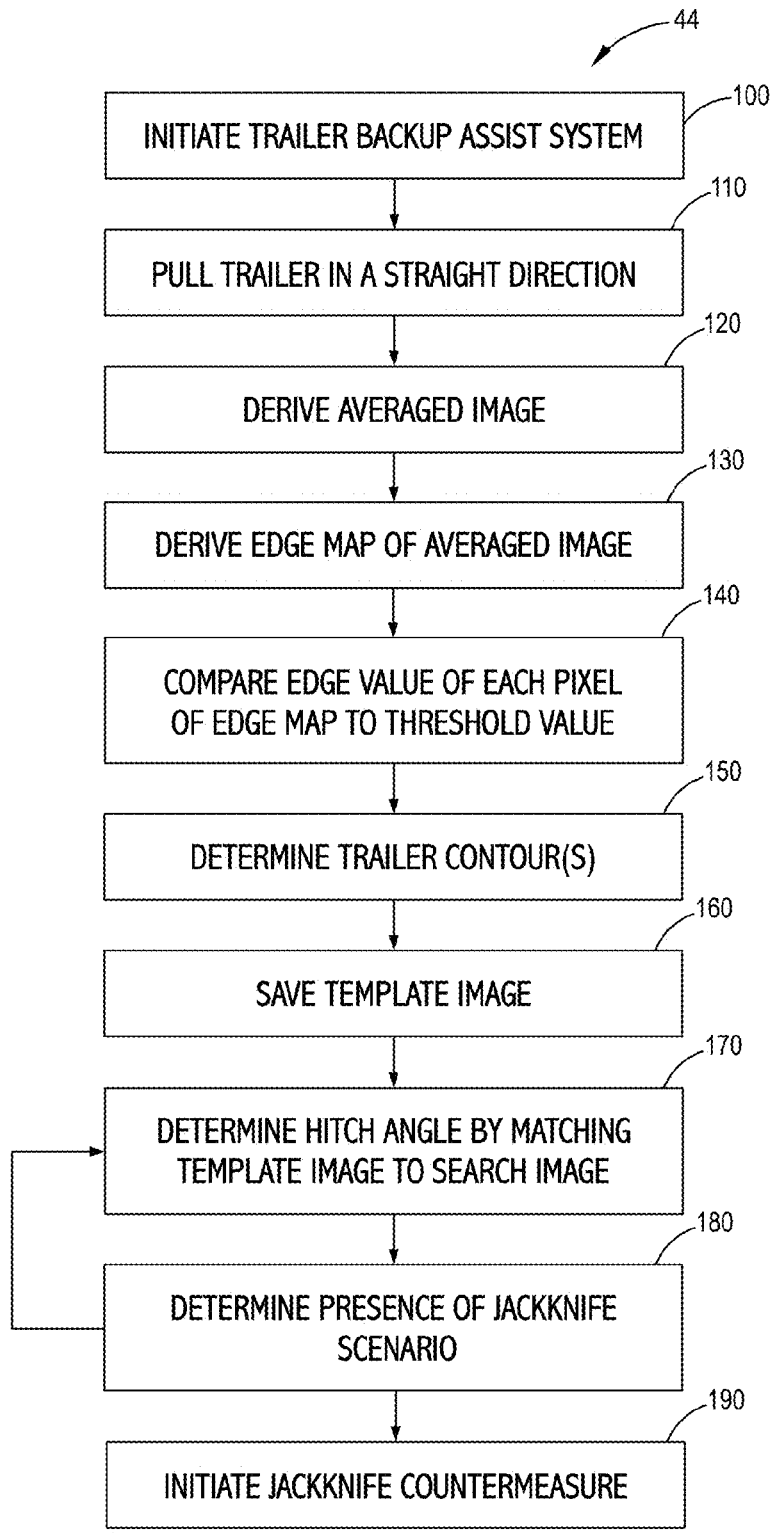
FIG. 3 is a flow diagram of a method of detecting a hitch angle, according to one embodiment.

Referring to FIG. 3, a method of detecting hitch angle is illustrated. The method, also referred to herein as "the template matching method," may be executed by the controller 38 of the trailer backup assist system 10 and is shown as one embodiment of the hitch angle detection routine 44. The template matching method generally includes processing image information to distinguish trailer contour from ground noise in images captured by the imaging device 34. The trailer contour then serves as a template and is matched to a search image to determine the hitch angle between the vehicle 14 and the trailer 12

Figure 4:
FIG. 4 is a captured image showing a trailer in straight alignment with a vehicle and the presence of ground noise.
Figure 5:
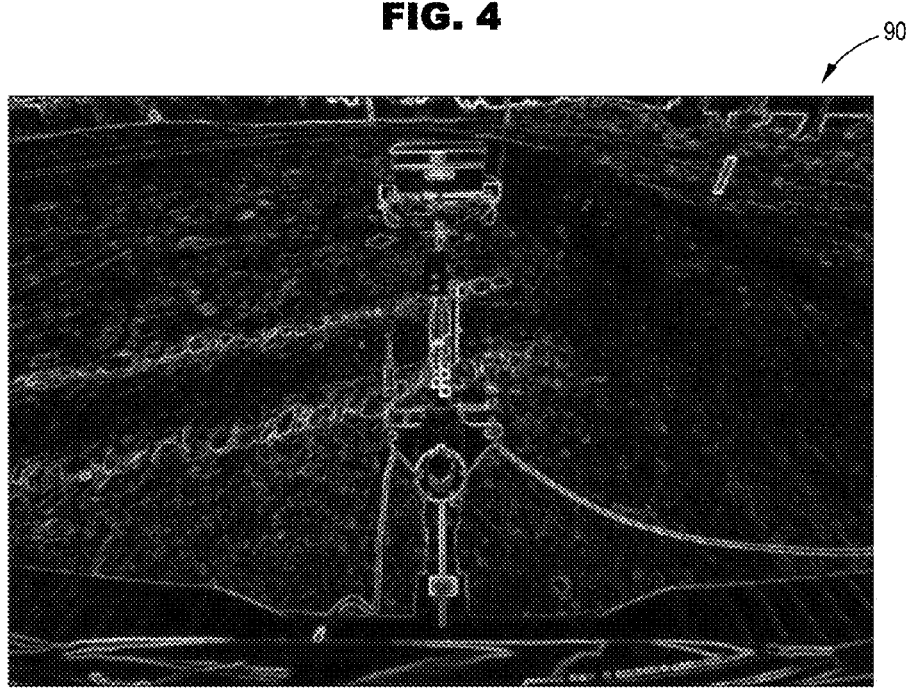
FIG. 5 is an edge map of the captured image shown in FIG. 4.

For purposes of illustration, a captured image 90 is exemplarily shown in FIG. 4 illustrating the trailer 12 in straight alignment with the vehicle 14 and the presence of ground noise. As defined herein, ground noise generally corresponds to any ground structure capable of interfering with image acquisition of the trailer 12. With respect to the captured image 90, potential ground noise candidates may include large stones (e.g., stone 92) and irregular ground surfaces (e.g., ground surface 94). As such, it may be difficult to accurately identify the trailer 12 when an image acquisition technique, namely edge detection, is applied to the captured image 90, as exemplarily shown in FIG. 5. With these things in mind, the template matching method described herein is able to blur out ground noise to enable identification of one or more trailer contours. Once identified, the trailer contour(s) may be stored as a template image that is matched to a search image to determine the hitch angle between the vehicle 14 and the trailer 12. In practice, the method has been found highly robust and benefits from relatively fast and straightforward computations.

Figure 6:
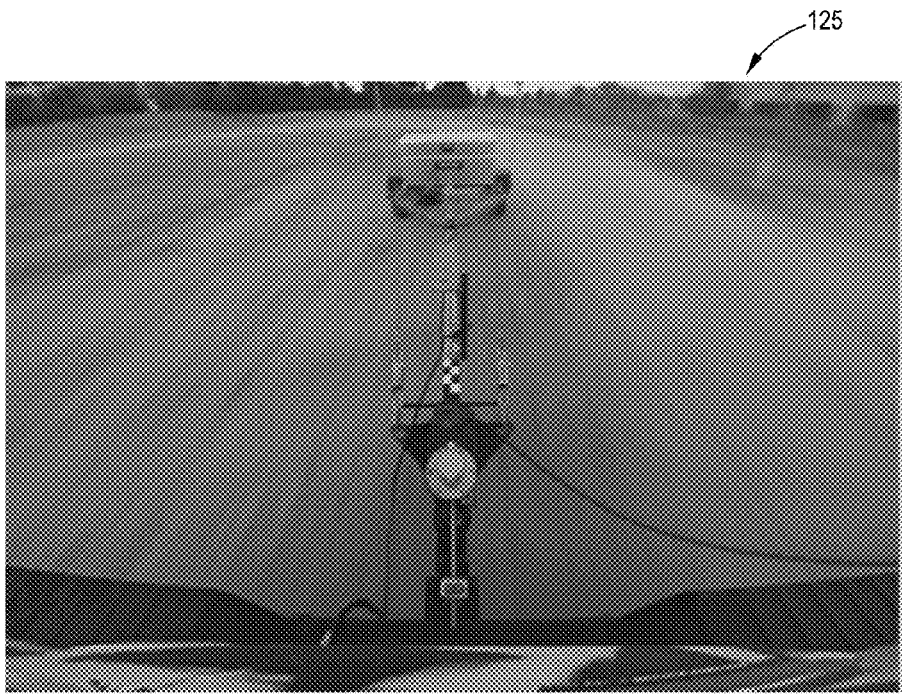
FIG. 6 illustrates the blurring of ground noise in an averaged image.

The template matching method may begin at step 100, where the driver or other occupant initiates the trailer backup assist system 10. This may be achieved via user-input made through the display 84 of the vehicle 14 or other conceivable means. At step 110, the driver is instructed to pull the trailer 12 in a straight direction such that the hitch angle between the vehicle 14 and the trailer 12 is substantially zero. While the vehicle 14 and trailer 12 are engaged in the straight pull maneuver, the controller 38 derives an averaged image of all images captured by the imaging device 34 during a period of time at step 120. It has been discovered that 1-3 seconds typically suffices. Notably, the trailer 12 appears stationary within the images captured by the imaging device 34 whereas ground noise constantly changes from image to image. Thus, with respect to the averaged image, pixels associated with the trailer 12 will keep their contrast whereas pixels associated with ground noise will be blurred. To illustrate this effect, an averaged image 125 is exemplarily shown in FIG. 6.

Figure 7:
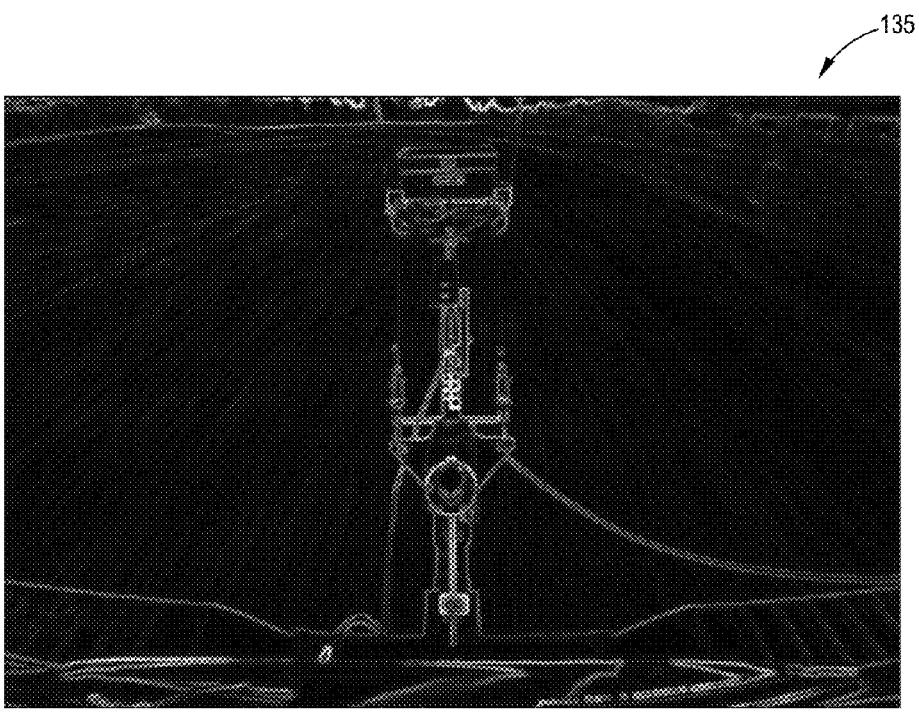
FIG. 7 is an edge map of the averaged image shown in FIG. 6.
Figure 8:
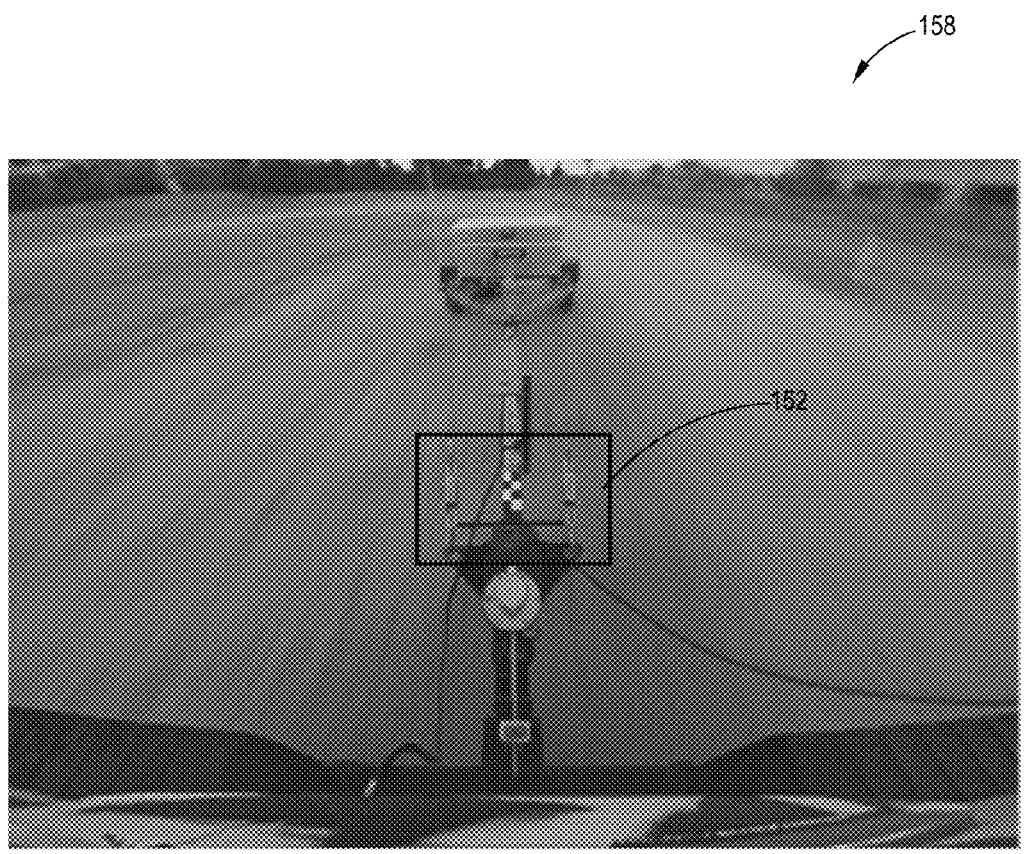
FIG. 8 illustrates a trailer contour of a template image.

At step 130, the controller 38 derives an edge map of the averaged image by calculating the intensity gradient for each pixel of the averaged image 125. The intensity gradient, or edge value, of each pixel may range from 0 to 255. For purposes of illustration, an edge map 135 is exemplarily shown in FIG. 7, in which the edge values of pixels associated with ground noise have been substantially weakened due to the blurring effect. At step 140, the controller 38 compares the edge value of each pixel of the edge map 135 to a threshold value (e.g., 30). Pixels having an edge value meeting or exceeding the threshold value are identified as trailer pixels whereas pixels having an edge value not meeting or exceeding the threshold value are identified as ground noise pixels. Once the trailer pixels have been identified, the controller 38 determines one or more trailer contours at step 150. The trailer contour(s) are saved to the memory 42 of the controller 38 as a template image at step 160 and may include a substantial entirety of the imaged trailer 12 or portions thereof. For purposes of illustration, a trailer contour 152 is shown in FIG. 8. As shown, the trailer contour 152 has a square shape, which is generally more computationally efficient. In its current position, the trailer contour 152 may serve as a zero hitch angle reference and enables the hitch angle between the vehicle 14 and the trailer 12 to be determined in subsequent images (i.e., search images) via template matching at step 170.

Figure 9:
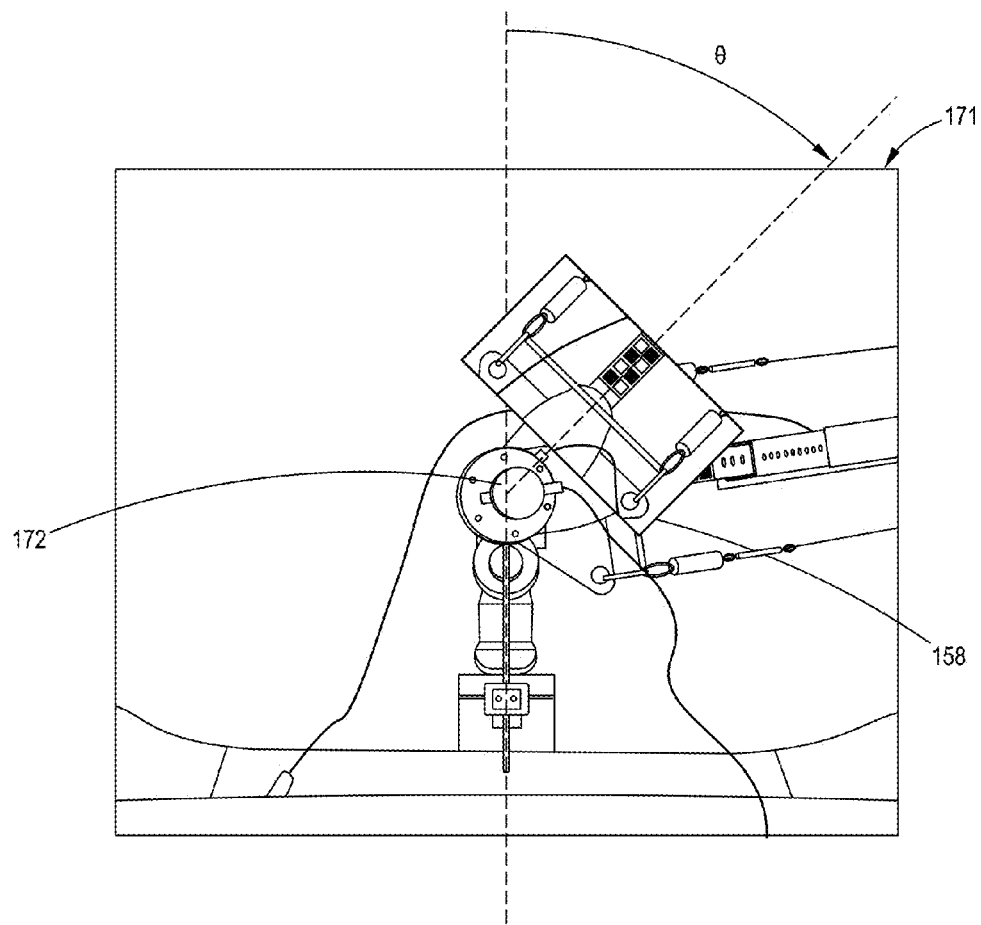
FIG. 9 illustrates a template image being matched to a search image to determine a hitch angle.

According to one embodiment, as shown in FIG. 9, the hitch angle between the vehicle 14 and the trailer 12 may be determined based on a positional relationship between a template image 158 and a search image 171. More specifically, the hitch angle may be determined by superimposing the template image 158 over the search image 171 such that the template image 158 is initially in a zero hitch angle position and subsequently rotating the template image 158 about a rotation point, preferably the imaged hitch point 172.

The direction of rotation can be predicted based on information received from the steering angle sensor 64 or other sensors from which an initial assessment can be made concerning the angular position of the trailer 12 relative to the vehicle 14. Once the template image 158 has been matched to the search image 171, the angle θ at which the template image 158 is rotated relative to the zero hitch angle position can be correlated to the hitch angle between the vehicle 14 and the trailer 12.

Figure 10:
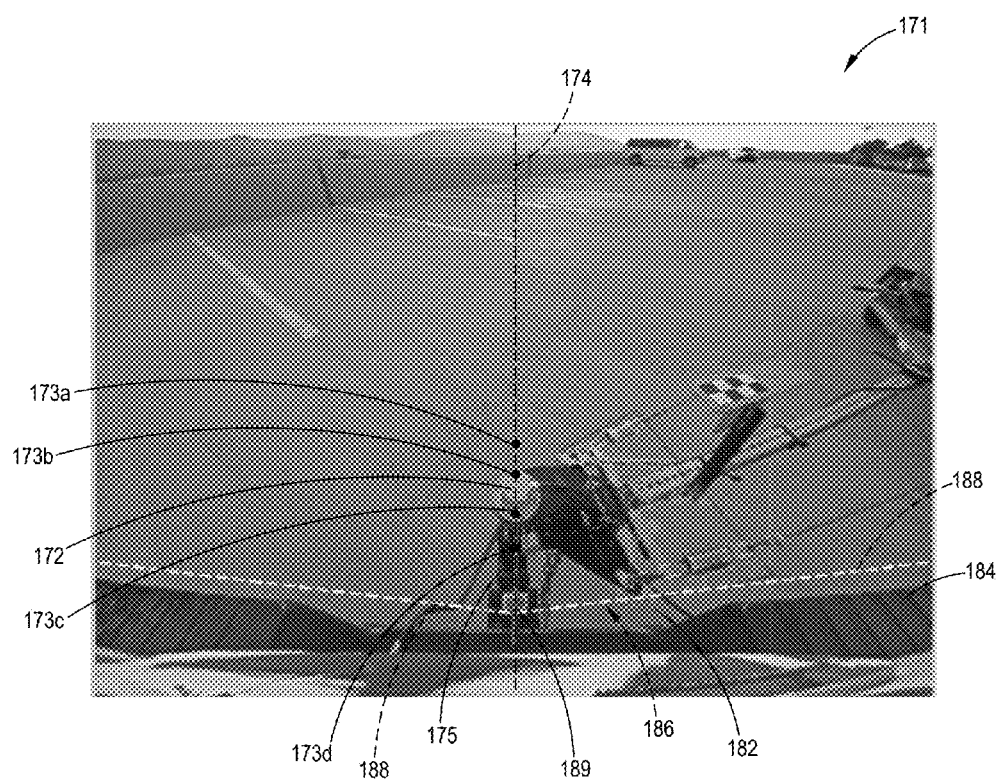
FIG. 10 is a search image having a proximity zone for jackknife detection and a number of candidate hitch point locations about which a template image can be rotated to determine an actual imaged hitch point and a hitch angle.

According to one embodiment, the imaged hitch point 172 may be determined through process of elimination. For instance, as exemplarily shown in FIG. 10, the controller 38 may define a number of candidate hitch point locations 173a-173d that are positioned along a reference line 174 that extends vertically across the middle column of the search image 171. The reference line 174 is defined by the controller 38 and is assumed to coincide with the center longitudinal axis of an imaged drawbar 175 and intersect with the hitch point 172 of the imaged vehicle 14 and trailer 12. The candidate hitch point locations 173a-173d are shown evenly spaced along the reference line 174 but may vary in number and spacing in other embodiments. Once the template image 158 has been derived and the vehicle 14 and trailer 12 are moving along a curved path, the controller 38 may superimpose the template image 158 onto the search image 171 at the zero hitch angle position and rotate the template image 158 about each of the candidate hitch point locations 173a-173d in an attempt to match the template image 158 with the search image 171. Based on the match quality, a confidence score is given to each candidate hitch point location 173a-173d and the candidate hitch point location 173a-173d receiving the highest confidence score is selected as the hitch point. In the event the matching quality associated with each candidate hitch point location 173a-173d is below a predetermined threshold, the controller 38 may define additional candidate hitch point locations (not shown) along the reference line 174 in either or both directions of the candidate hitch point location 173a-173d that received the highest confidence score and execute template matching with respect to each of the additional candidate hitch point locations. This process may be iterated as many times as needed until the predetermined threshold has been met. In so doing, the location of the candidate hitch point location that is ultimately selected as the imaged hitch point will closely mirror the location of the actual hitch point 172.

While matching the template image 158 to the search image 171, the controller 38 may additionally determine the presence of an imminent jackknife scenario at step 180. With continued reference to FIG. 10, the displacement of the template image 158 may be monitored relative to a proximity zone 182 while the template image 158 is rotated about the rotation point. In the illustrated embodiment, the proximity zone 182 may be defined as the space between an imaged rear bumper 184 of the vehicle 14 and a boundary line 186 that is defined by the controller 38 and overlaid onto the search image 171. The boundary line 186 may be v-shaped and includes a pair of straight segments 188 extending outwardly at an angle from a point 189 that is located on the reference line 174 and is disposed between the imaged hitch point 172 and the imaged rear bumper 184. It should be appreciated that the boundary line 186 may assume other shapes in alternative embodiments. The location and shape of the boundary line 186 may be determined based on various considerations such as, but not limited to, vehicle speed, trailer length, drawbar length, imager characteristics, trailer contour, and vehicle contour. It is generally assumed that vehicle speed, trailer length, drawbar length, and image characteristics are known or may be otherwise measured and inputted to the trailer backup assist system 10. Vehicle contour, such as that of the imaged rear bumper 184, may be programmed at the factory.

In the event the template image 158 crosses into the proximity zone 182 of the search image 171, the controller 38 determines that an imminent jackknife scenario is present and initiates a jackknife countermeasure at step 190. Otherwise, if it is determined that an imminent jackknife scenario is not present, the controller 38 may continue to determine the hitch angle between the vehicle 14 and the trailer 12, as discussed previously with respect to step 170. The jackknife countermeasure may include generating an auditory warning via the vehicle alert system 74, generating a visual warning via the display 84, generating a braking command to the vehicle brake control system 70, reducing the torque of the powertrain control system 72, modifying the steering angle of the vehicle 14, or a combination thereof in addition to any other conceivable countermeasures. Since the trailer 12 will likely be in motion upon the controller 38 determining that an imminent jackknife scenario is present, it is generally desirable to locate and dimension the proximity zone 182 in a manner that provides sufficient time for a jackknife scenario to be detected and a countermeasure to be implemented, thereby minimizing the potential of an actual jackknifing and/or collision between the trailer 12 and the vehicle 14. Doing so also overcomes any response latency that may be inherent in the trailer backup assist system 10. While steps 170 and 180 have been illustrated in a linear fashion, it should be appreciated that both steps may be performed simultaneously.

Figure 11:
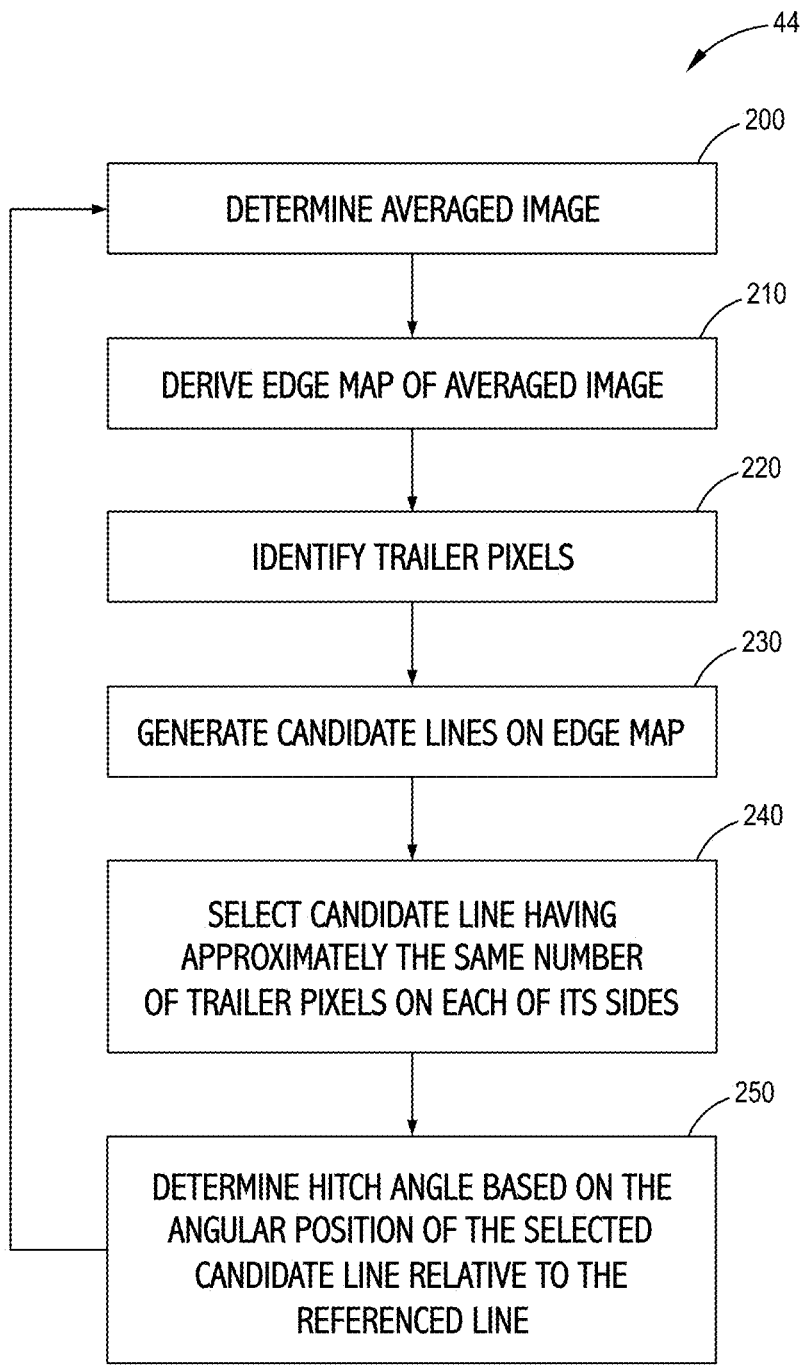
FIG. 11 is a flow diagram of a method of detecting a hitch angle, according to another embodiment.

Referring to FIG. 11, another method of detecting hitch angle is illustrated. The method, also referred to herein as "the centerline method," may be executed by the controller 38 of the trailer backup assist system 10 and is exemplarily shown as one embodiment of the hitch angle detection routine 44. The centerline method also utilizes image information obtained by processing images captured by the imaging device 34 to determine the hitch angle between the vehicle 14 and the trailer 12. The centerline method differs from the template matching method in that the vehicle 14 and the trailer 12 need not be moving a straight direction prior to hitch angle detection, thus making the centerline method particularly useful in instances where no template image is available for the trailer 12 and the driver is prevented from pulling the trailer 12 in a straight line. When compared to the template matching method, the centerline method generally benefits from faster processing times, but is also generally less reliable. Therefore, it can be said that the centerline method provides a quick start to hitch angle detection and may be replaced at a later time by the template matching method or other suitable methods providing more reliable hitch angle measurements. Thus, for purposes of illustration, the centerline method will be described in greater detail below under the condition that no template image is available and that the vehicle 14 and trailer 12 are initially moving along a curved path.

Figure 12:
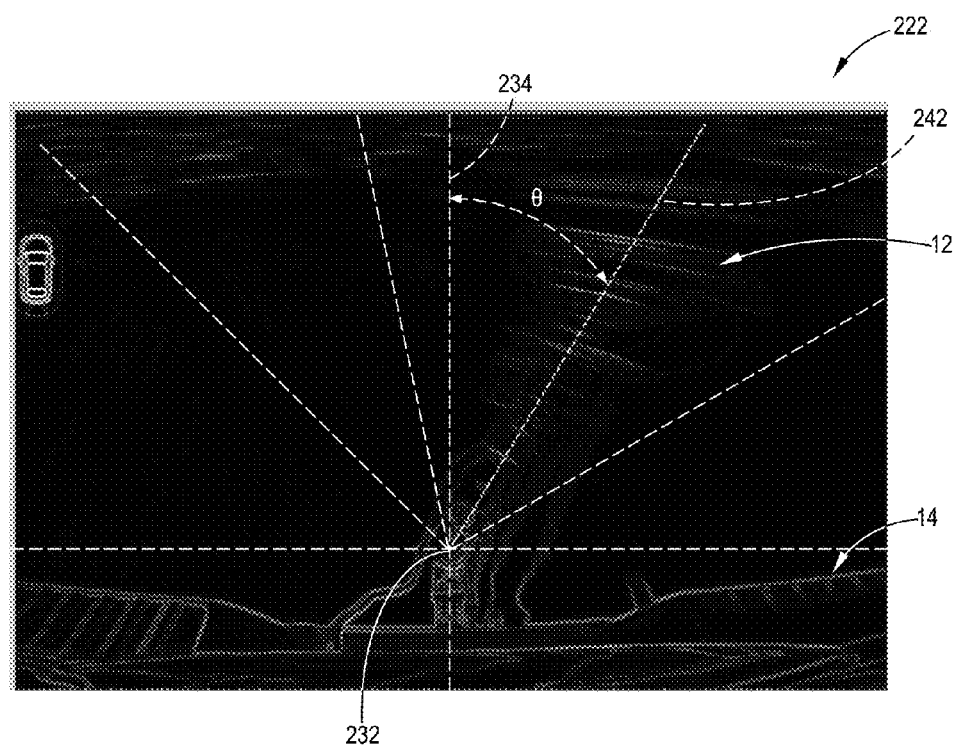
FIG. 12 is an edge map of a captured image showing a number of candidate lines, one of which, is selected to determine a hitch angle based on its angular position relative to a reference line.

The centerline method may begin at step 200, where the controller 38 processes successive images captured by the imaging device 34 to derive an averaged image. At step 210, the controller 38 derives an edge map by calculating an intensity gradient, or edge value, for each pixel in the averaged image. At step 220, the controller 38 identifies trailer pixels in the edge map by comparing the edge value of each pixel to a threshold value and selecting only those pixels meeting or exceeding the threshold value to correspond to trailer pixels. For purposes of illustration, an edge map 222 is exemplarily shown in FIG. 12, wherein one embodiment of the imaged trailer 12 appears slightly blurred as a result of angular displacement of the trailer 12 relative to the vehicle 14. It is contemplated that additional threshold values may be used to differentiate between trailer pixels and vehicle pixels since vehicle pixels will generally have a higher degree of contrast relative to trailer pixels due to the blurring of the trailer 12. At step 230, the controller 38 defines a number of candidate lines on the edge map 222, as exemplarily shown in FIG. 12. The candidate lines project outwardly from a common projection point, preferably the imaged hitch point 232. The direction at which the candidate lines project may vary based on a width of the rear bumper of the vehicle 14, a length of the drawbar of the vehicle 14, and a length of the tongue of the trailer 12. In the illustrated embodiment, the candidate lines may vary from −90 degrees to 90 degrees with respect to a reference line 234 that is indicative of a predetermined hitch angle (e.g., a zero hitch angle) and extends vertically across the middle column of the edge map 222 and intersects the imaged hitch point 232. While the exact location of the imaged hitch point 232 may be unknown initially, the controller 38 may assign a default projection point from which to project the candidate lines. Since it's assumed the hitch point 232 will typically be located along the reference line 234 and usually falls within a predictable range (e.g., 10-20 centimeters from the rear bumper of the vehicle 14), the selection of a default projection point meeting the foregoing criteria is generally sufficient for the purposes of initial hitch angle detection.

At step 240, the controller 38 selects the candidate line (e.g., candidate line 242) having approximately the same number of trailer pixels on each of its sides, or said differently, the candidate line, or centerline, about which the trailer pixels are substantially symmetric. Once the controller 38 has made a candidate line selection, the controller 38 may determine the hitch angle between the vehicle 14 and the trailer 12 based on the angular position of the selected candidate line 242 relative to the reference line 234 at step 250. More specifically, the angle θ between the selected candidate line 242 and the reference line 234 can be correlated to the hitch angle between the vehicle 14 and the trailer 12. As the vehicle 14 and trailer 12 continue along its course, steps 200-250 may be iterated with subsequent images captured by the imaging device 34 to continually provide hitch angle measurements.

Figure 13:
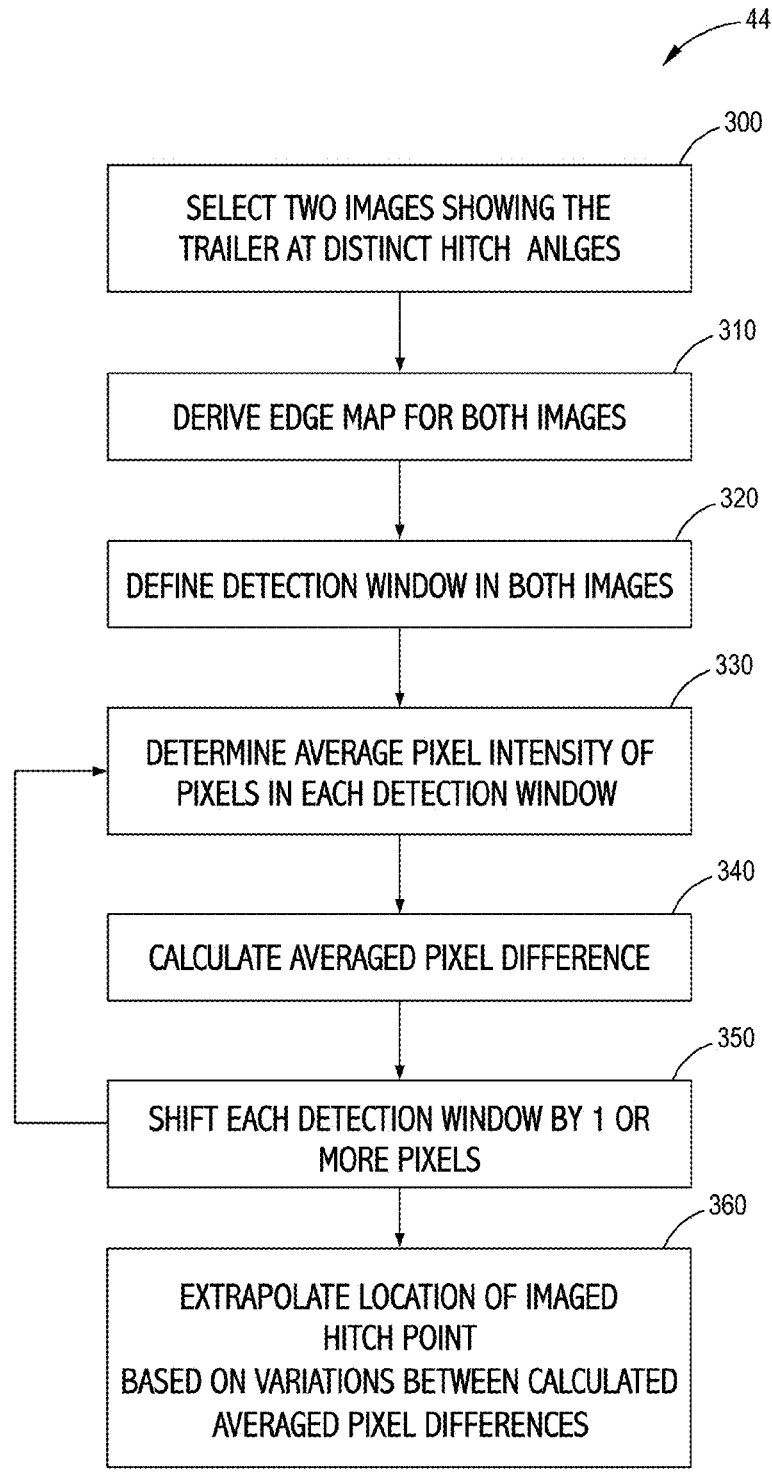
FIG. 13 is a flow diagram of a method of locating an imaged hitch point, according to one embodiment.

Referring to FIG. 13, a method of locating an imaged hitch point in images captured by the imaging device 34 is illustrated. The method, also referred to herein as "the drawbar scan method," may be executed by the controller 38 of the trailer backup assist system 10 and may be embodied as a subroutine of the hitch angle detection routine 44. The drawbar scan method generally requires the trailer 12 to be moving relative to the vehicle 14 at a non-zero hitch angle in order to identify an imaged hitch point. As such, the drawbar scan method may be executed to provide a suitable rotation point or projection point when executing the centerline method or the template matching method in instances where the vehicle 14 and trailer 12 are moving along a curved path. By identifying the imaged hitch point, more accurate hitch angle measurements can be achieved.

Figure 14:
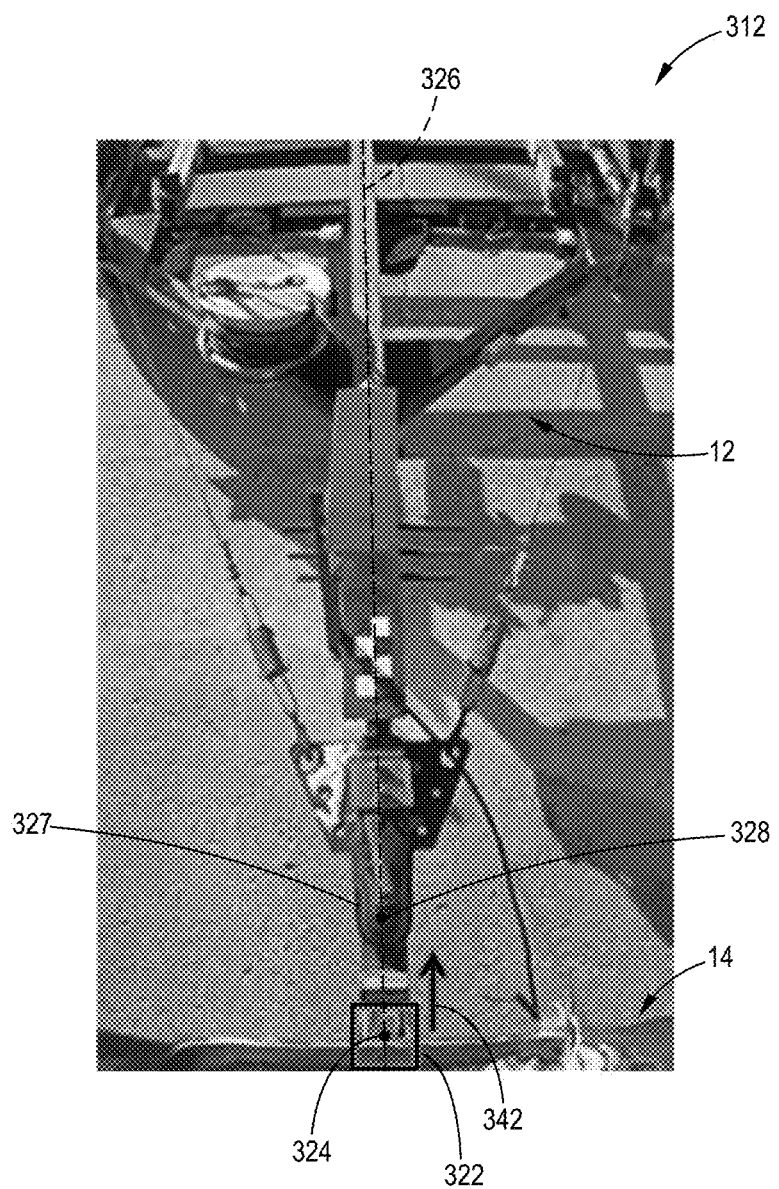
FIGS. 14 and 15 are each captured images in which a trailer appears at a distinct hitch angle and a detection window is used to scan an imaged drawbar to locate an imaged hitch point.
Figure 15:
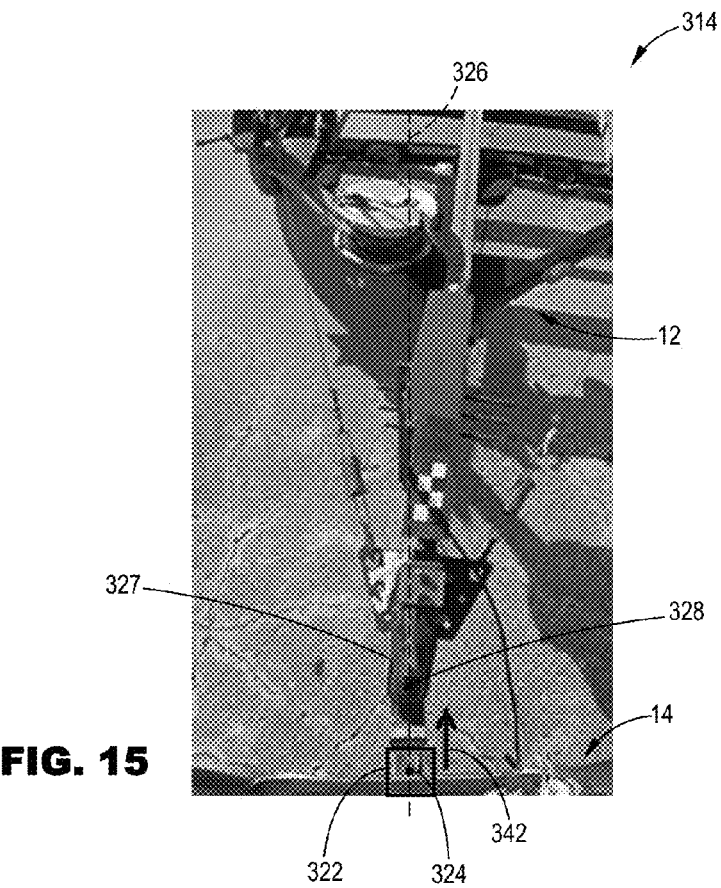

The drawbar scan method generally begins at step 300, where the controller 38 selects two images captured by the imaging device 34 that show the trailer 12 at distinct hitch angles. The two images may be successive or non-successive depending on the frame rate of the imaging device 34. In practice, a noticeable difference in hitch angles between the two images is generally preferred. At step 310, the controller 38 derives an edge map for both images by calculating the intensity gradient, or edge value, for each of their corresponding pixels. For purposes of illustration, FIG. 14 shows a first image 312 in which the hitch angle between the vehicle 14 and the trailer 12 is approximately zero whereas FIG. 15 shows a second image 314 in which the hitch angle between the vehicle 14 and the trailer 12 is approximately 5 degrees relative to the zero hitch angle position shown in FIG. 14. For purposes of clarity, the edge maps associated with both images 312, 314 are not shown. At step 320, the controller 38 defines a detection window 322 of variable height and width in both images 312, 314. Each detection window 322 is centered at a common pixel position, such as pixel position 324, which is located on a reference line 326 that extends vertically across the middle column of the corresponding image 312, 314. The reference line 326 is defined by the controller 38 and is assumed to coincide with the center longitudinal axis of an imaged drawbar 327 and intersect with an imaged hitch point 328 between the vehicle 14 and the trailer 12.

At step 330, the controller 38 determines an average pixel intensity of the pixels bounded by each detection window 322 when centered at the current pixel position, and at step 340, the controller 38 calculates an averaged pixel difference, which is defined herein as the absolute value of the difference between the average pixel intensities, as calculated at step 330. Once the average pixel difference has been calculated, at step 350, the controller 38 shifts each detection window 322 in an upward vertical direction (as specified by arrow 342) so that each detection window 322 is commonly centered at a new pixel position that is 1 or more pixel positions higher on the corresponding reference line 326 than the previous pixel position. Thus, by making multiple iterations of steps 330-350, the controller 38 may calculate averaged pixel differences for when each detection window 322 is commonly centered at a number of pixel positions along the reference line 326. Once this has been done, at step 360, the controller 38 extrapolates the location of the hitch point 328 based on variations in the calculated averaged pixel differences.

Figure 16:
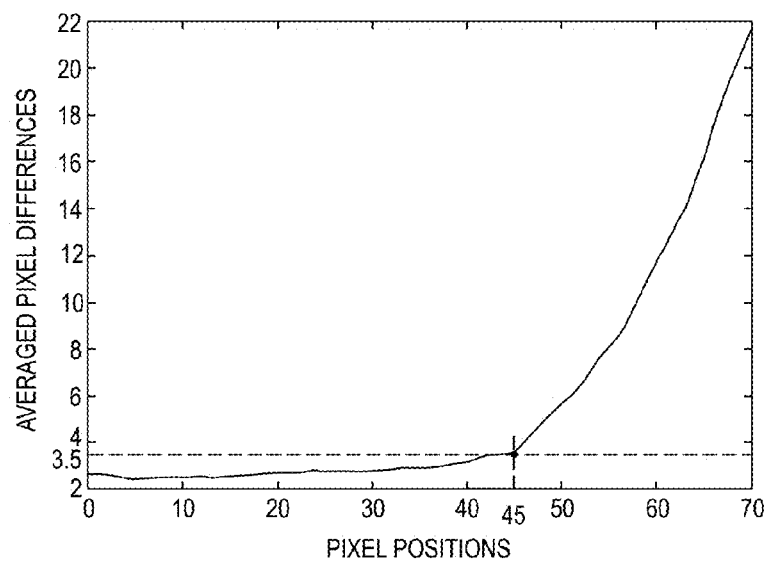
FIG. 16 is a graph illustrating averaged pixel differences for a number of pixel positions common to the captured images shown in FIGS. 14 and 15.

With respect to images 312 and 314, it is generally expected that little variation will occur between the calculated averaged pixel differences associated with pixel positions that coincide with the imaged drawbar 327 due in part to the imaged drawbar 327 appearing in a common fixed position in both images 312, 314. In contrast, it is generally expected that greater variation to occur between the calculated averaged pixel differences associated with pixel positions that are located on portions of the reference line 326 that extend beyond the imaged drawbar 327 due in part to the trailer 12 appearing in different positions in both images 312, 314. For purposes of illustration, a graph is shown in FIG. 16 illustrating calculated averaged pixel differences for a number of pixel positions along the vertical reference line 326. The pixel positions may fall within a predetermined range in which the imaged hitch point 328 is expected to be located, thereby negating the need to determine averaged pixel differences for pixel positions along the vertical reference line 326 that are unlikely to correspond to the imaged hitch point 328.

As shown in FIG. 16, the graph generally demonstrates a relatively constant averaged pixel difference between 2 and 3 when each detection window 322 is commonly centered at pixel positions 0-44 as those pixel positions coincide with the imaged drawbar 327. In contrast the graph in FIG. 15 generally demonstrates a sharp increase in averaged pixel differences when each detection window 322 is commonly centered at pixel positions 46-70 as those pixel positions are located on portions of the reference line 326 that extend past the imaged drawbar 327. Recognizing this, the controller 38 may select, as the imaged hitch point 328, one of the pixel positions (e.g., pixel position 44 or 45) leading up to the sharp increase in averaged pixel differences. According to one embodiment, the controller 38 may iterate steps 330-350 of the drawbar scan method until the averaged pixel difference meets or exceeds a predetermined threshold value (e.g., 3.5) and select, as the imaged hitch point, the pixel position associated with the calculated averaged pixel difference that meets or exceeds the threshold value. This threshold value may be determined based on a number of considerations including, but not limited to, the size of the detection window 322, properties of the imaging device 34, etc. Once identified, the selected imaged hitch point should closely mirror the actual imaged hitch point 328 and may be used for hitch angle detection pursuant to the template matching method or the centerline method.

Referring to FIG. 17, a kinematic model of the vehicle 14 and trailer 12 is shown and serves as the basis for determining hitch angle according to another method, referred to herein as "the steady state method" and described in greater detail below. As shown in FIG. 17, the kinematic model is based on various parameters associated with the vehicle 14 and the trailer 12. These parameters include:

δ: steering angle at steered wheels 60 of the vehicle 14;
α: yaw angle of the vehicle 14;
β: yaw angle of the trailer 12;
γ: hitch angle between the vehicle 14 and the trailer 12 (γ=β−α);
W: wheelbase length between a front axle 370 and a rear axle 372 of the vehicle 14;
L: drawbar length between the hitch point 32 and the rear axle 372 of the vehicle 14;
D: trailer length between the hitch point 32 and axle 20 of the trailer 12 or effective axle for a multiple axle trailer; and
v: vehicle longitudinal speed.

From the kinematic model shown in FIG. 17, the yaw rate of the vehicle 14 may be represented with the following equation:

$$\frac{d\alpha}{dt} = -\frac{v}{W}\tan\delta$$

Furthermore, the yaw rate of the trailer 12 may be represented with the following equation:

$$\frac{d\beta}{dt} = \frac{v}{D}\sin\gamma + \frac{Lv}{DW}\cos\gamma\tan\delta$$

Accordingly, when the yaw rate of the vehicle 14 and the trailer 12 become equal, the hitch angle γ and the steering angle δ will be constant. This condition, referred to herein as steady state, can occur when a steering command is steadily maintained during a backing maneuver such as when the trailer 12 is reversed in a straight line with the vehicle 14 or when the vehicle 14 and trailer 12 are turning at a constant curvature for at least a threshold period of time or over a threshold distance of motion. Under such steady state driving conditions, the resulting hitch angle γ can be described using the following equation:

$$c = a\cos\gamma + b\sin\gamma$$

This equation can be rewritten as follows:

$$c = a\sqrt{1-\sin^2\gamma} + b\sin\gamma$$

The above equation can be rearranged into quadratic form and rewritten as follows:

$$c^2 - a^2 - 2bc\sin\gamma + (b^2+a^2)\sin\gamma = 0$$

Solving the quadratic equation for the hitch angle γ yields the following hitch angle equation:

$$\gamma = \arcsin\frac{bc \pm a\sqrt{b^2 + a^2 - c^2}}{b^2 + a^2}$$

Where, $$c = -\frac{1}{W}\tan\delta$$

$$b = \frac{1}{D}$$

$$a = \frac{L}{DW}\tan\delta$$

Accordingly, for a particular vehicle and trailer combination, the trailer length D, the wheelbase length W, and the drawbar length L are constant and assumed known. Thus, when the steady state condition is satisfied, the hitch angle γ between the vehicle 14 and trailer 12 may be determined as a function of the trailer length D, the wheelbase length W, the drawbar length L, and the steering angle δ.

Figure 18:
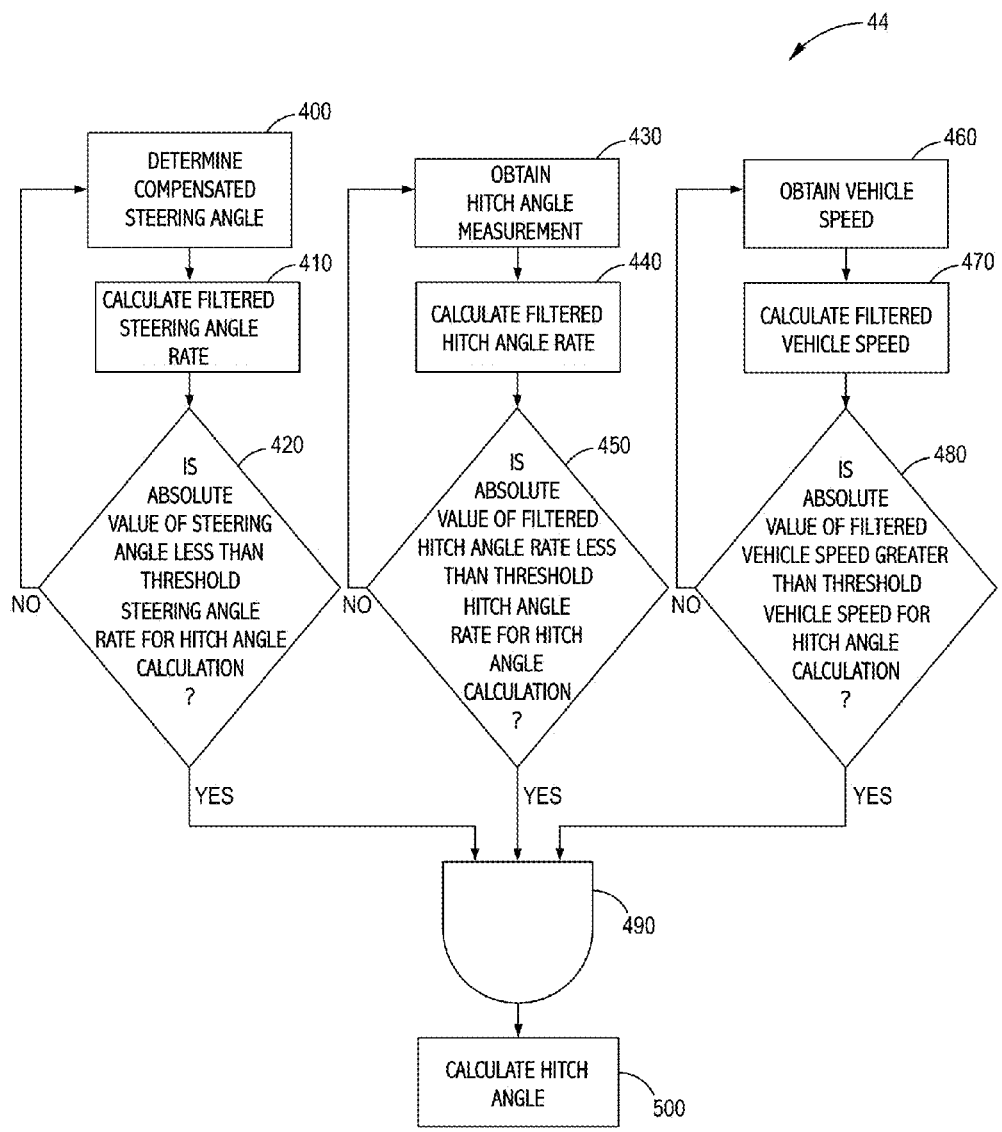
FIG. 18 is a flow diagram of a method of detecting a hitch angle, according to yet another embodiment.

Referring to FIG. 18, the steady state method is shown according to one embodiment. The steady state method may be executed by the controller 38 of the trailer backup assist system 10 and is exemplarily shown as one embodiment of the hitch angle detection routine 44. The method includes determining a steering angle at step 400. The steering angle may be provided by the steering angle sensor 64 and may be compensated to remove any offsets associated therewith. Next, at step 410, a steering angle rate is calculated and is filtered to remove noise. At step 420, it is determined whether the absolute value of the filtered steering angle rate is less than a threshold steering angle rate (e.g., 0.5 degrees per second) required for hitch angle calculation. The method also includes obtaining a hitch angle between the vehicle 14 and trailer 12, as measured pursuant to any of the hitch angle detection methods described herein (e.g., the centerline method) at step 430. At step 440, the controller 38 calculates a filtered hitch angle rate and determines at step 450 whether the absolute value of the filtered hitch angle rate is less than a threshold hitch angle rate (e.g., 0.5 degrees per second) required for hitch angle calculation. The method further includes obtaining a vehicle speed (e.g., from speed sensor 50) at step 460, calculating a filtered vehicle speed at step 470, and then determining at step 480 whether the absolute value of the filtered vehicle speed is greater than a threshold vehicle speed (e.g., 3 kilometers per second) required for hitch angle calculation. If the conditions specified at steps 420, 450, and 480 are met at step 490, the controller 38 determines that the steady state condition has been satisfied and calculates a hitch angle at step 500 using the hitch angle equation described herein with respect to the kinematic model shown in FIG. 17. So long as the steady state condition is satisfied, the controller 38 may continue to determine hitch angle via the hitch angle equation.

Figure 19:
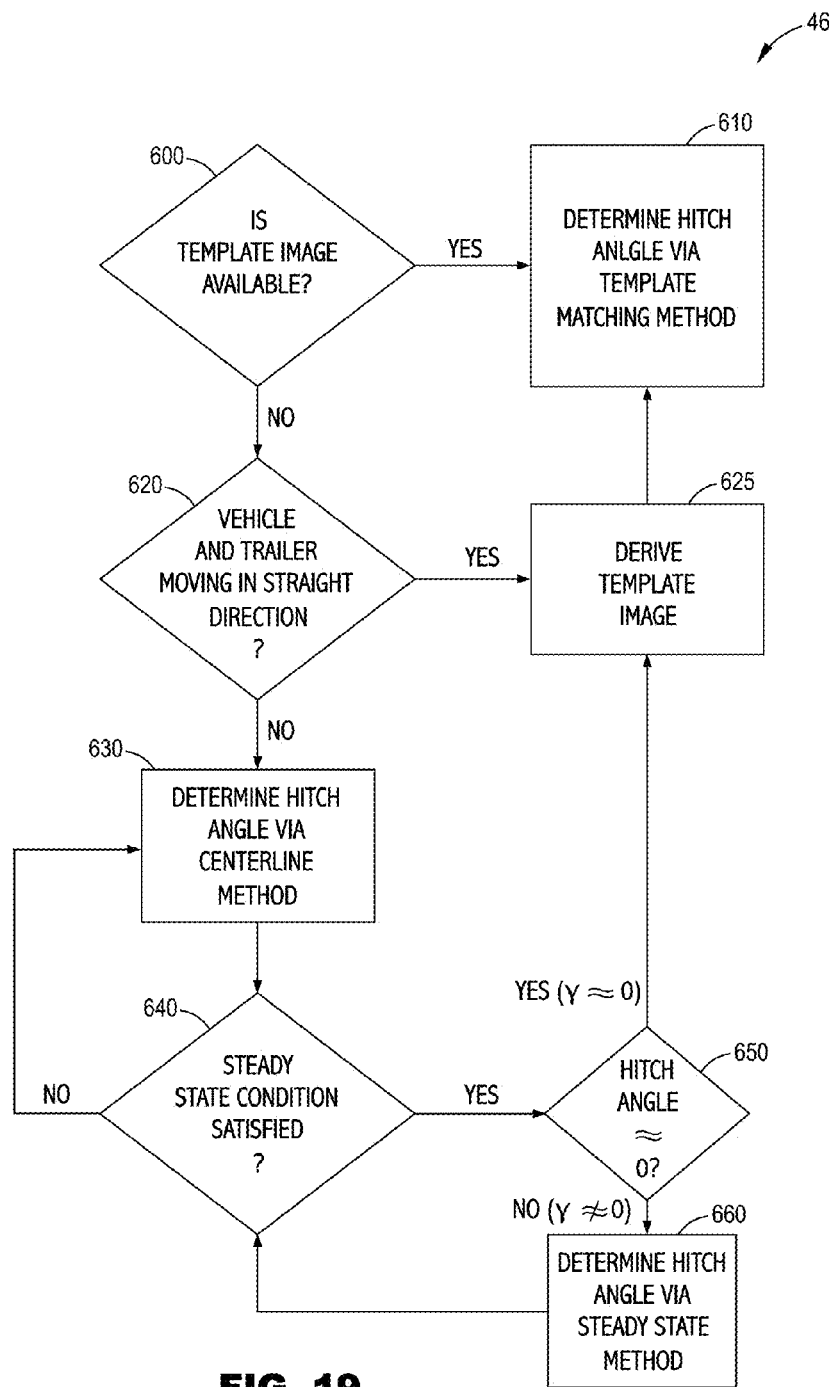
FIG. 19 is a flow diagram of a method of initializing hitch angle detection, according to one embodiment.

Referring to FIG. 19, a method of initializing hitch angle detection is illustrated. The method, referred to herein as the "hitch angle initialization method," may be executed by the controller 38 of the trailer backup assist system 10 and is exemplarily shown as one embodiment of the operating routine 46. The hitch angle initialization method includes selecting between the various hitch angle detection methods described previously herein, which include the template matching method, the centerline method, and the steady state method, for the purposes of hitch angle detection. As described in greater detail below, the foregoing hitch angle detection methods generally vary in processing time and reliability. Thus, the hitch angle initialization method is executed in a manner such that the "best available" hitch angle method is chosen based on considerations including the availability of a template image for the trailer 12 being towed and current driving conditions.

The hitch angle initialization method may begin at step 600, where the controller 38 determines whether a template image is available for the trailer 12 being towed. If so, the controller 38 proceeds to step 610 to determine the hitch angle via the template matching method. The template matching method may determine the hitch angle in approximately 1 second and is generally the most reliable when compared to the centerline method and the steady state method. So long as the template image remains available, the template matching method is selected as the best available hitch angle detection. In the event no template image is available or the template matching method is unable to be executed (e.g., system error), the controller 38 proceeds to step 620 to determine whether the vehicle 14 and trailer 12 are moving in a straight direction. According to one embodiment, the direction of the vehicle 14 and trailer 12 may be determined by obtaining a steering angle from the steering angle sensor 64 over a period of time. If it is determined that the vehicle 14 and trailer 12 are moving in a straight direction, the controller 38 proceeds to step 625 and processes images captured by the imaging device 34 to derive a template image of the trailer 12 before proceeding to step 610 to determine the hitch angle via the template matching method. Otherwise, the controller 38 proceeds to step 630 to determine the hitch angle via the centerline method. The centerline method may determine the hitch angle in less than 1 second but is generally less reliable when compared to the template matching method and the steady state method.

Once the centerline method is selected, the controller 38 will continue to determine the hitch angle via the centerline method until a steady state condition is satisfied at step 640. As described previously herein, the steady state condition may be satisfied when the vehicle 14 and trailer 12 are moving in a straight direction or moving along a path at constant curvature. Or in other words, the steady state condition is satisfied when the yaw rate of the vehicle 14 and the trailer 12 become equal, thereby resulting in the hitch angle and the steering angle becoming constant. If the steady state condition is satisfied, the controller proceeds to step 650, where it determines whether the hitch angle is substantially zero. In instances where the steady state condition is satisfied due to the vehicle 14 and trailer 12 moving in a straight direction at a constant zero hitch angle value ($\gamma$=0), the controller 38 proceeds to step 625 and processes images captured by the imaging device 34 to derive a template image of the trailer 12 before proceeding to step 610 to determine the hitch angle via the template matching method. Otherwise, in instances where the steady state condition is satisfied due to the vehicle 14 and trailer 12 moving along a path at a constant non-zero hitch angle value ($\lambda \neq 0$), the controller proceeds to step 660 to determine the hitch angle via the steady state method. The steady state method may determine the hitch angle in approximately 1-3 seconds and is generally less reliable than the template matching method but more reliable than the centerline method. So long as the steady state condition is satisfied, the controller 38 will select either the template matching method or the steady state method. If the steady state method is the currently selected hitch angle detection method and the steady state condition is no longer satisfied, the controller 38 returns to step 630 to determine the hitch angle via the centerline method.

It is to be understood that variations and modifications can be made on the aforementioned structures and methods without departing from the concepts of the present invention, and further it is to be understood that such concepts are intended to be covered by the following claims unless these claims by their language expressly state otherwise.

The invention claimed is:

1. A method of locating an imaged hitch point between a vehicle and a trailer, comprising the steps of:
   capturing images of the trailer using an imaging device;
   providing a controller configured to:
   a) select two images captured by the imaging device;
   b) derive an edge map for each of the two images,
   c) define a detection window centered at a common pixel position in each of the two images;
   d) calculate an average pixel intensity of the pixels bounded by each detection window;
   e) calculate an averaged pixel difference defined as an absolute value of the difference between the average pixel intensities calculated at d);
   f) shift each detection window in a common direction such that the detection window in each of the two images is centered at a new common pixel position,
   g) iterate d)-f) until the calculated averaged pixel difference meets or exceeds a threshold value; and
   h) select as the imaged hitch point, the common pixel position associated with the calculated averaged pixel difference that meets or exceeds the threshold value.

2. The method of claim 1, wherein the two images selected by the controller each show the trailer at a distinct hitch angle with regards to the vehicle.

3. The method of claim 2, wherein the two images are successive or non-successive.

4. The method of claim 1, wherein each detection window is shifted along a reference line that extends vertically across a middle column of the corresponding image.

5. The method of claim 4, wherein the reference line coincides with a longitudinal axis of an imaged drawbar and intersects with the imaged hitch point.

6. A system for locating an imaged hitch point between a vehicle and a trailer, comprising:
   an imaging device disposed on the vehicle and configured to capture images of the trailer;
   a controller operably coupled to the imaging device and configured to:
   a) select two images captured by the imaging device;
   b) derive an edge map for each of the two images;
   c) define a detection window centered at a common pixel position in each of the two images;
   d) calculate an average pixel intensity of the pixels bounded by each detection window;
   e) calculate an averaged pixel difference defined as an absolute value of the difference between the average pixel intensities calculated at d);
   f) shift each detection window in a common direction such that the detection window in each of the two images is centered at a new common pixel position;

g) iterate d)-f) until the calculated averaged pixel difference meets or exceeds a threshold value; and
h) select as the imaged hitch point, the common pixel position associated with the calculated averaged pixel difference that meets or exceeds the threshold value.

7. The system of claim 6, wherein the two images selected by the controller each show the trailer at a distinct hitch angle with regards to the vehicle.

8. The system of claim 7, herein the two images are successive or non-successive.

9. The system of claim 6, wherein each detection window is shifted along a reference line that extends vertically across a middle column of the corresponding image.

10. The system of claim 9, wherein the reference line coincides with a longitudinal axis of an imaged drawbar and intersects with the imaged hitch point.

* * * * *